United States Patent [19]

Yamamoto et al.

[11] Patent Number: 5,187,778

[45] Date of Patent: Feb. 16, 1993

[54] BUFFERED DISK UNIT AND METHOD OF TRANSFERRING DATA THEREIN

[75] Inventors: Akira Yamamoto, Sagamihara; Hiroyuki Kitajima, Yokohama; Akira Kurano, Odawara; Michio Miyazaki, Odawara; Masafumi Nozawa, Odawara; Takikazu Takeuchi, Odawara, all of Japan

[73] Assignee: Hitachi, Ltd., Tokyo, Japan

[21] Appl. No.: 579,718

[22] Filed: Sep. 10, 1990

[30] Foreign Application Priority Data

Sep. 13, 1989 [JP] Japan .................. 1-237892

[51] Int. Cl.⁵ .................................. G06F 13/14
[52] U.S. Cl. ........................ 395/250; 395/275; 364/236.2; 364/238.6; 364/239; 364/239.7; 364/251; 364/252; 364/DIG. 1; 364/926.3; 364/926.92; 364/939.3; 364/952.1; 364/959.1; 364/960; 364/DIG. 2
[58] Field of Search .......... 395/425, 275, 250; 364/36.2, 238.6, 239, 239.7, 251, 252, DIG. 1, 926.3, 926.92, 939.3, 952.1, 959.1, 960, DIG. 2, 200, 900

[56] References Cited

U.S. PATENT DOCUMENTS

| | | | |
|---|---|---|---|
| 4,454,595 | 6/1984 | Cage | 364/900 |
| 4,476,526 | 10/1984 | Dodd | 364/200 |
| 4,593,354 | 6/1986 | Ushiro | 364/200 |
| 4,607,328 | 8/1986 | Furukawa et al. | 364/200 |
| 4,667,286 | 5/1987 | Young et al. | 364/200 |
| 4,800,483 | 1/1989 | Yamamoto et al. | 364/200 |
| 5,056,010 | 10/1991 | Huang | 364/200 |

FOREIGN PATENT DOCUMENTS

| | | |
|---|---|---|
| 58-186867 | 10/1983 | Japan . |
| 59-33689 | 2/1984 | Japan . |
| 59-38866 | 3/1984 | Japan . |
| 59-100964 | 6/1984 | Japan . |

*Primary Examiner*—Michael R. Fleming
*Assistant Examiner*—Glenn A. Auve
*Attorney, Agent, or Firm*—Antonelli, Terry, Stout & Kraus

[57] ABSTRACT

Buffers are separately provided for a region for non-sequential transfer and for a region for sequential transfer in each one of the disk units. A director sends a message to inform at least one of the disk units whether transfer of data the respective disk units are to make is sequential or non-sequential. When the disk unit receives a non-sequential transfer request, it uses the buffer region for non-sequential transfer to transfer data requested by the director and when it receives a sequential transfer request, it uses a plurality of buffer regions for the sequential transfer. Thus, data transfer is performed between a host device and that disk unit.

42 Claims, 37 Drawing Sheets

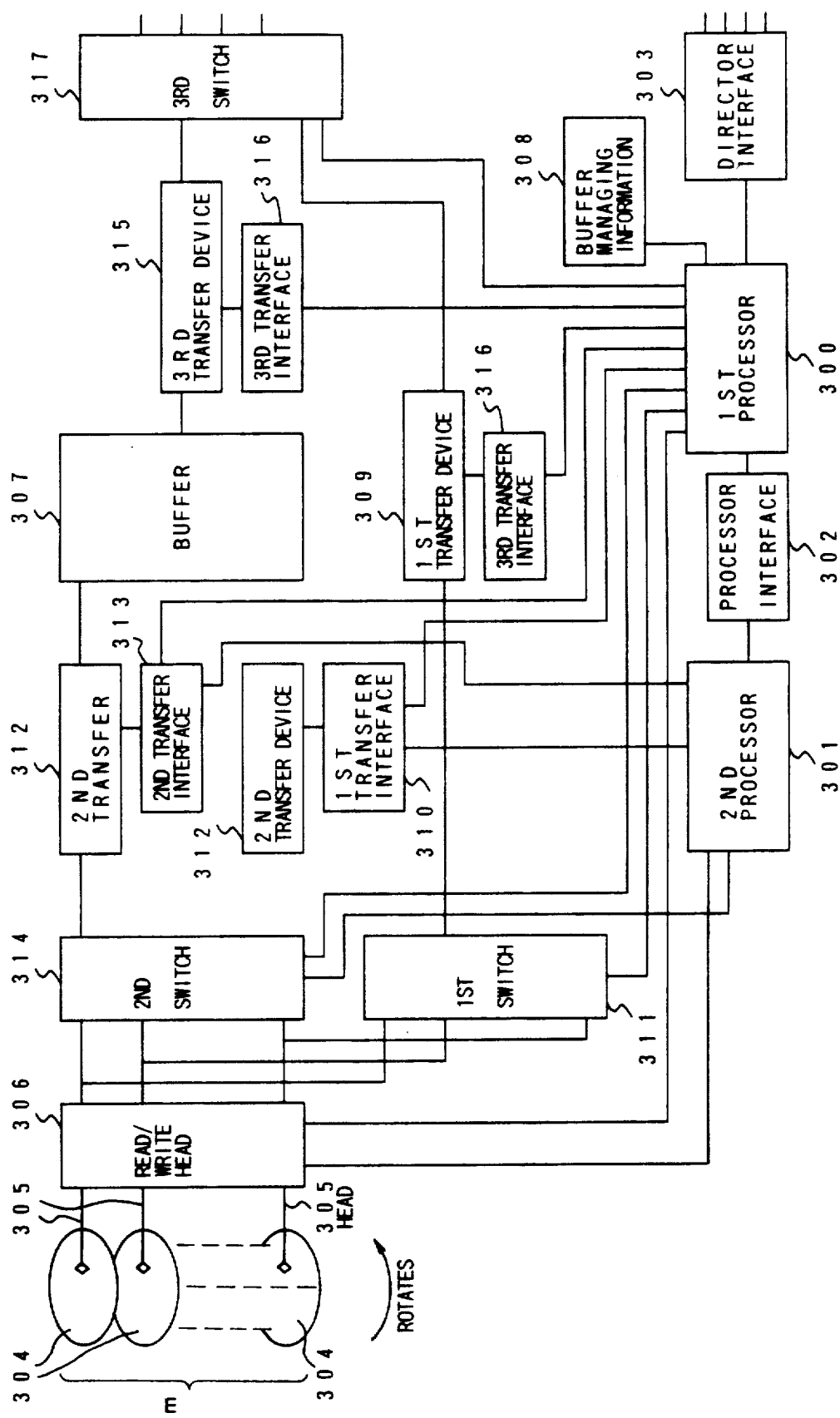

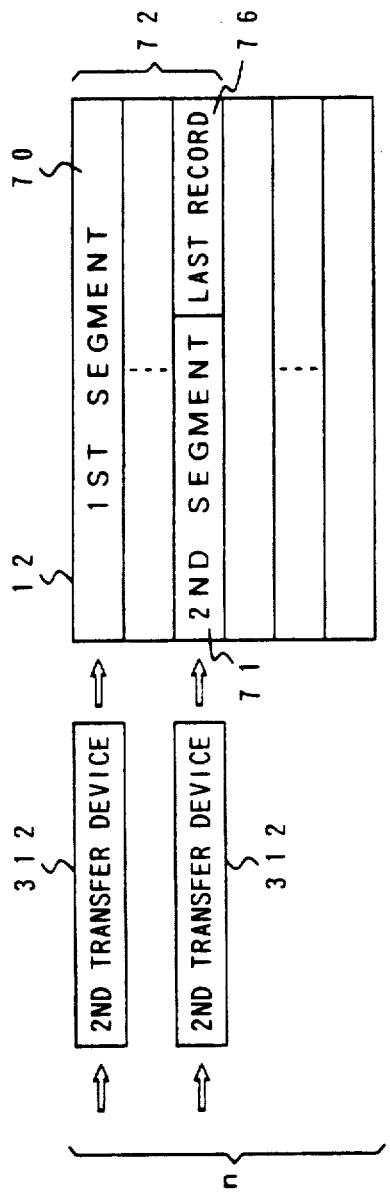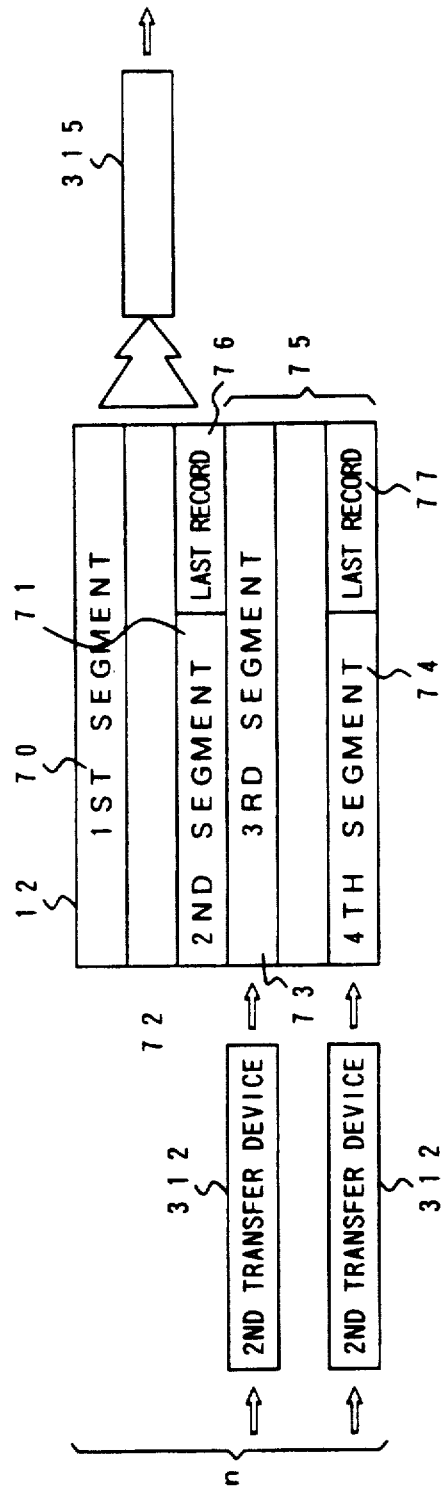

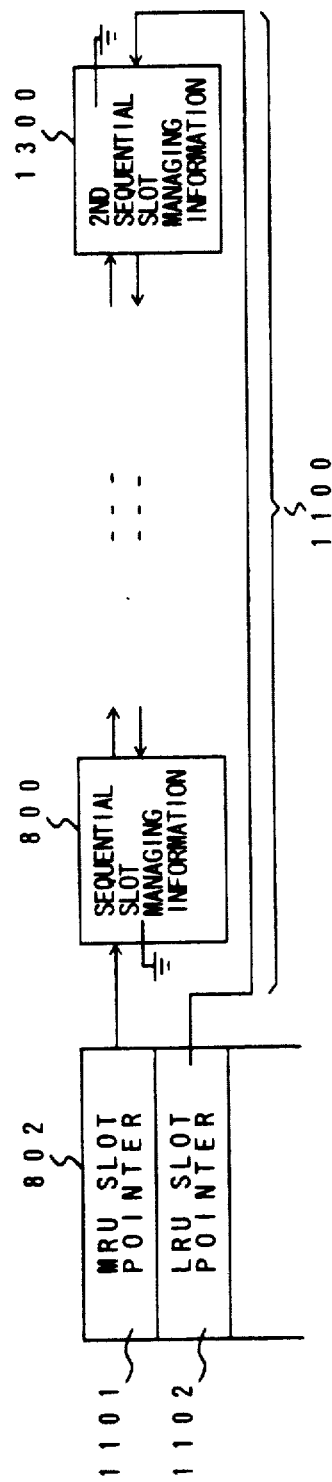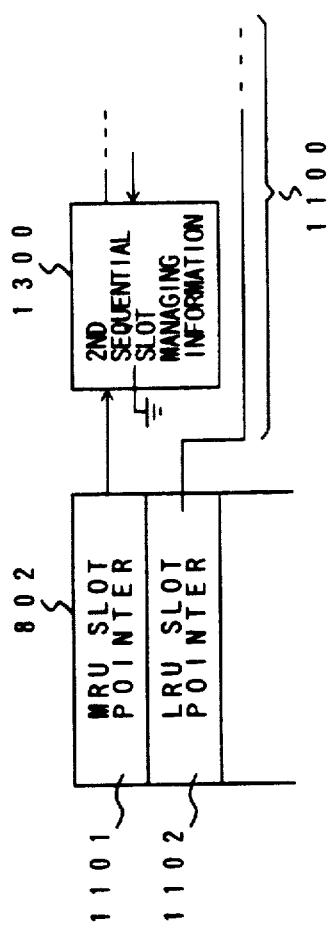

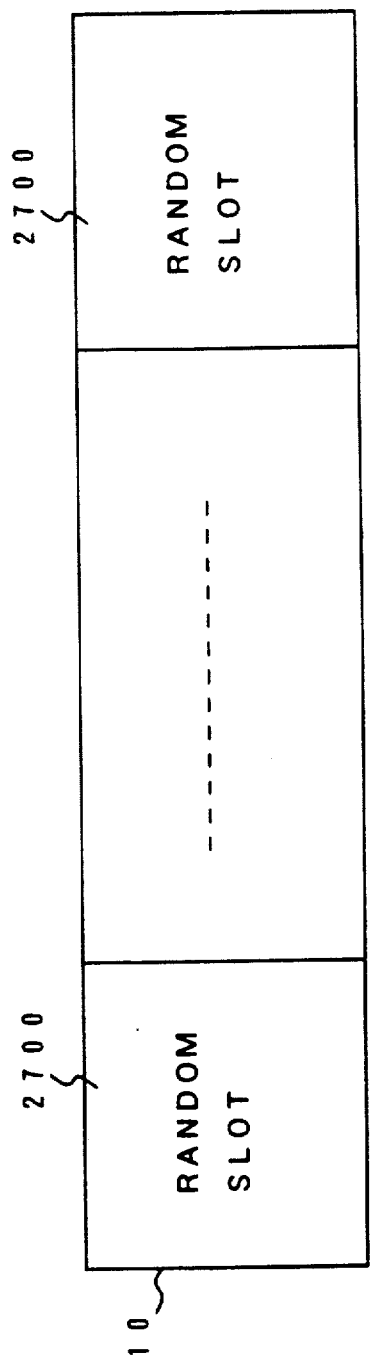

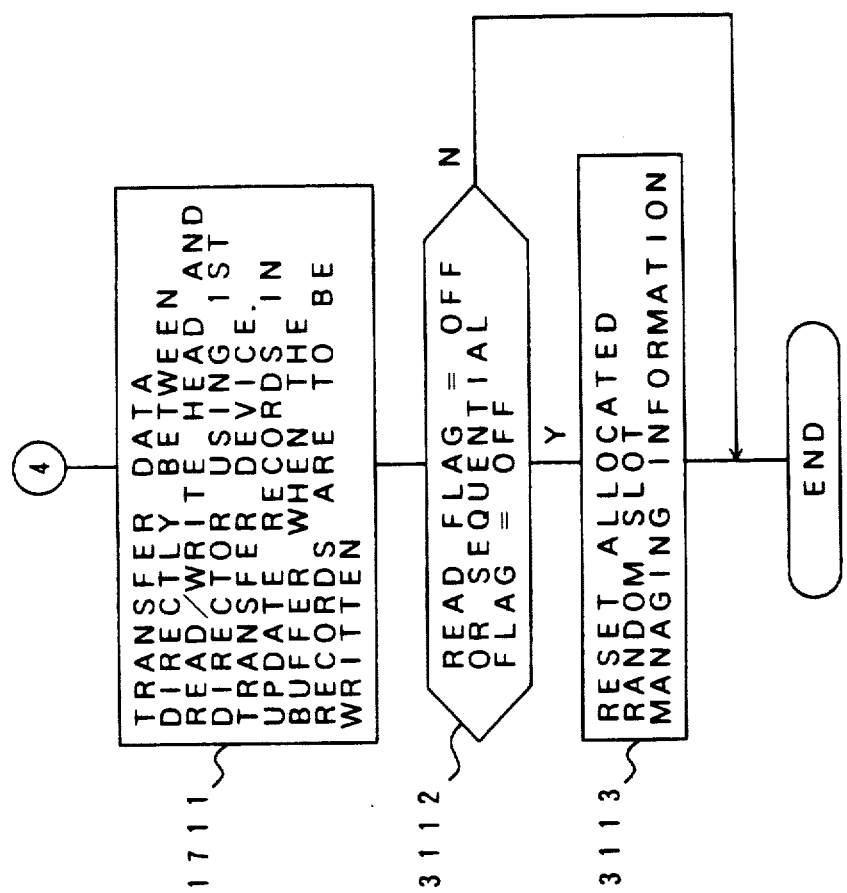

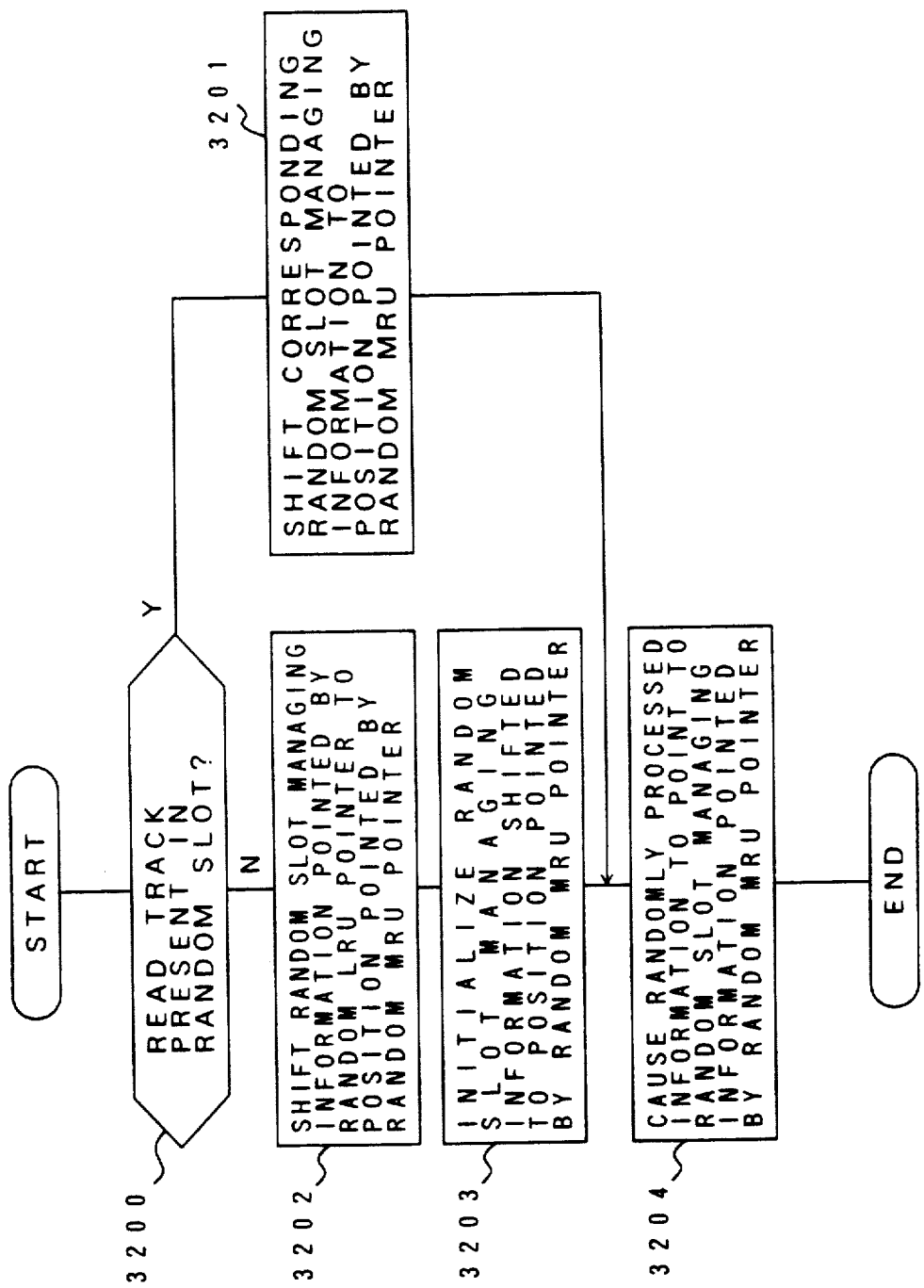

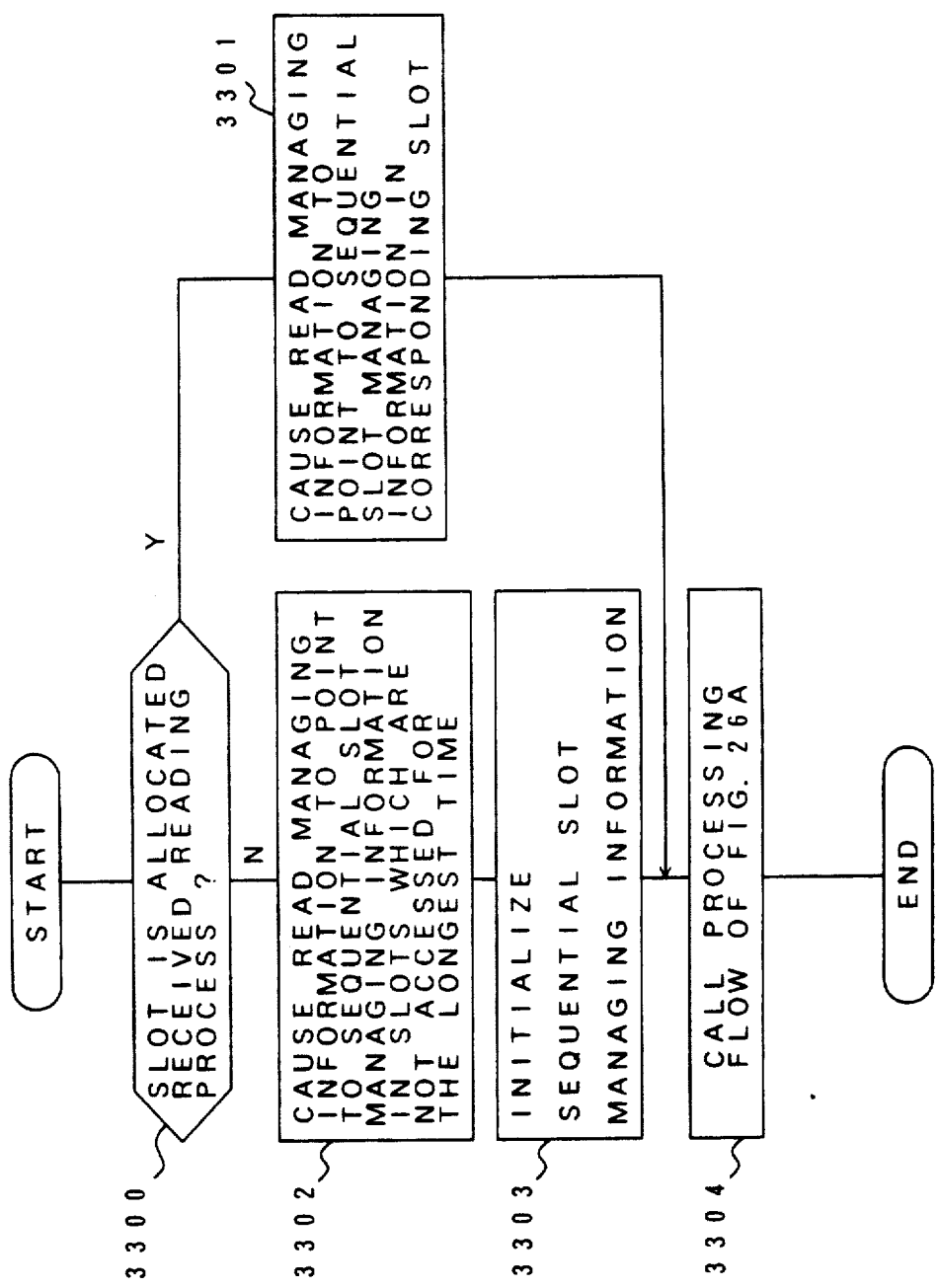

BUFFERED DISK UNIT AND METHOD OF TRANSFERRING DATA THEREIN

BACKGROUND OF THE INVENTION

The present invention relates to buffered disk units and a method of transferring data therein, and more particularly, to a buffered disk unit and a method of transferring data therein at an increased speed.

In a computer system where a plurality of disk units are usually connected with a controller, the locating process, including seeking and sector setting operations, is performed before data transfer separately from the controller in order to efficiently use data transfer path. Thus, the plurality of disk units connected with the controller can independently execute the locating process.

In such a control system, however, a disk unit may already have been transferring/receiving data to/from the controller when a sending disk unit is intended to start data transfer after its locating process has been completed. This is referred to as "reconnection miss after location is completed". If this phenomenon occurs, the different disk unit cannot secure a data transfer path, so the different disk must wait until the different disk unit makes a complete rotation in order to enter into the data transfer.

A mechanism to prevent this "reconnection miss after location is completed" is proposed, for example, in Japanese Patent Application JP-A-57-146359 (or Japanese Patent Publication JP-B-62-3455) where a buffer having a small capacity is provided in each disk unit. According to this method, if a disk unit is already transferring/receiving data to/from the controller when the sending disk has completed its locating process, data on the different disk unit is temporarily loaded on its buffer and the loaded data is transferred to the controller when the transfer of the data on the sent disk unit is completed.

A method is proposed which simplifies a locating Process for a disk unit. For example, Japanese Patent Application JP-A-59-38866 proposes a process which reads data on a plurality of tracks into a buffer, using a plurality of read circuits, while the disk unit makes a complete rotation.

According to this method, data on tracks which are not ordered to be read by the controller is also read into the buffer. This process aims at prefetching data for sequential reading. When data is actually ordered to be read, it is directly read out by a buffer without locating a disk unit to reduce the number of locating processes executed. Therefore, a buffer having a large capacity is provided.

Japanese Patent Application JP-A-59-100964 discloses a technique for increasing the speed of inputting/outputting data using a cache storage provided in a controller which is connected to disk units. This technique realizes an increase in the speed of inputting/outputting data by causing a director (data transfer control processor) in the controller to transfer data in a parallel manner between the CPU and the cache storage and between the cache storage and the disk unit.

In JP-A-59-33689 and JP-A-58-186867, a method is disclosed allocating the slots of a disk cache memory to input/output requests. However, neither a disclosure nor a suggestion concerning an allocation method considering the characteristics of a sequential input/output request is found in these documents.

The above conventional techniques have the following problems:

(1) The sequential process occupies a large proportion of the transfer of data to the disk units. The sequential process differs greatly in access pattern from the other processes. The conventional techniques do not distinguish between the sequential access pattern and the non-sequential access pattern and do not allow for the buffer allocation method to those corresponding access patterns.

(2) When a plurality of programs executed in concurrently by a host computer system make a request for inputting/outputting data to/from a disk, program B may make a request for transfer of data after sequential transfer of program A is completed and before the next sequential transfer of program A is started, thereby destroying data loaded in the buffer. The conventional technique does not allow for such a problem.

(3) When a plurality of sequential transfer processes are executed in parallel and a request for sequential transfer of a new program is accepted, the already allocated buffers are required to be reallocated. The conventional technique does not allow for a method of such reallocation.

It is an object of the present invention to provide a buffered disk unit and a method of transferring data therein which solves the above problems and improves the processing speed.

SUMMARY OF THE INVENTION

In order to achieve the above object, the present invention provides a buffered disk unit and a method of transferring data therein, in a computer system which comprises a disk unit with a buffer, a controller including a director, the director being connected through a channel with a host computer, the buffer including a sequential transfer region and a non-sequential transfer region separated from the sequential transfer region. When the director informs the disk unit of an input/output request from the host computer, the director also informs the disk unit about whether the input/output request is for sequential transfer or not. Thus, the use of any one of both the sequential and non-sequential transfer areas is determined in accordance with that request to thereby transfer data between the disk unit and the host computer.

Independent managing processes are applied to the non-sequential and the sequential transfer areas to improve the performance of the disk unit. For example, the non-sequential transfer area may include a single buffer allocation unit. The sequential transfer area may include a plurality of buffer allocation units.

The buffer allocation units in the sequential transfer area are arranged in order of time when data transfer is executed, and managed.

In the present invention, the non-sequential and sequential transfer areas are separately provided in the disk unit. The controller informs the disk unit about whether the transfer process provided by the controller to the disk unit is sequential transfer or non-sequential transfer. This is because the effects derived from the use of buffers differ between the sequential transfer and the non-sequential transfer where the next data to be transferred are obvious and unobvious, respectively.

In the present prevention, when a non-sequential transfer request is received, data required by the controller is loaded in the buffer region unit for non-sequential transfer.

When a sequential transfer request is received, the plurality of sequential transfer region units are used.

In this case, if the received sequential transfer request is one which is not allocated buffer allocation units, a buffer allocation unit to be allocated is determined by the use of the LRU (Least Recently Used) queue. Thereafter, data to be next transferred in addition to the data requested by the controller is located on the buffer allocation unit.

If the sequential transfer request is already allocated a buffer allocation unit, data in the buffer is only transferred to the controller without directly accessing the disk medium. A quantity of data in the buffer allocation units for the sequential transfer is reduced below a predetermined value after transfer to the controller and the data to be accessed next is loaded automatically.

Thus, the number of times of locating the buffered disk is reduced thus improving the processing speed.

BRIEF DESCRIPTION OF THE DRAWINGS

FIG. 5 is a schematic of a buffered disk unit of the first embodiment;

FIGS. 8A and 8B illustrate data transfer in the first embodiment;

FIGS. 15A and 15B illustrate a process of operating the LRU queue 1100 performed when a sequential read processing request which has not allocated a slot is accepted in the first embodiment;

FIG. 27 illustrates a buffer 10 for random processing in a third embodiment of the present invention;

FIGS. 31A, 31B, 31C and 31D are flowcharts indicating the operation of the first processor 300 performed when the first processor has received an input/output request from the director 25 in the third embodiment;

FIG. 32 is a flowchart indicative of the operation of the first processor 300 performed when the first processor has received a non-sequential reading request; and FIG. 33 is a flowchart indicative of the operation performed when there is a slot to be allocated to the sequential reading operation in the third embodiment.

DESCRIPTION OF THE PREFERRED EMBODIMENTS

First Embodiment

Figure 1:
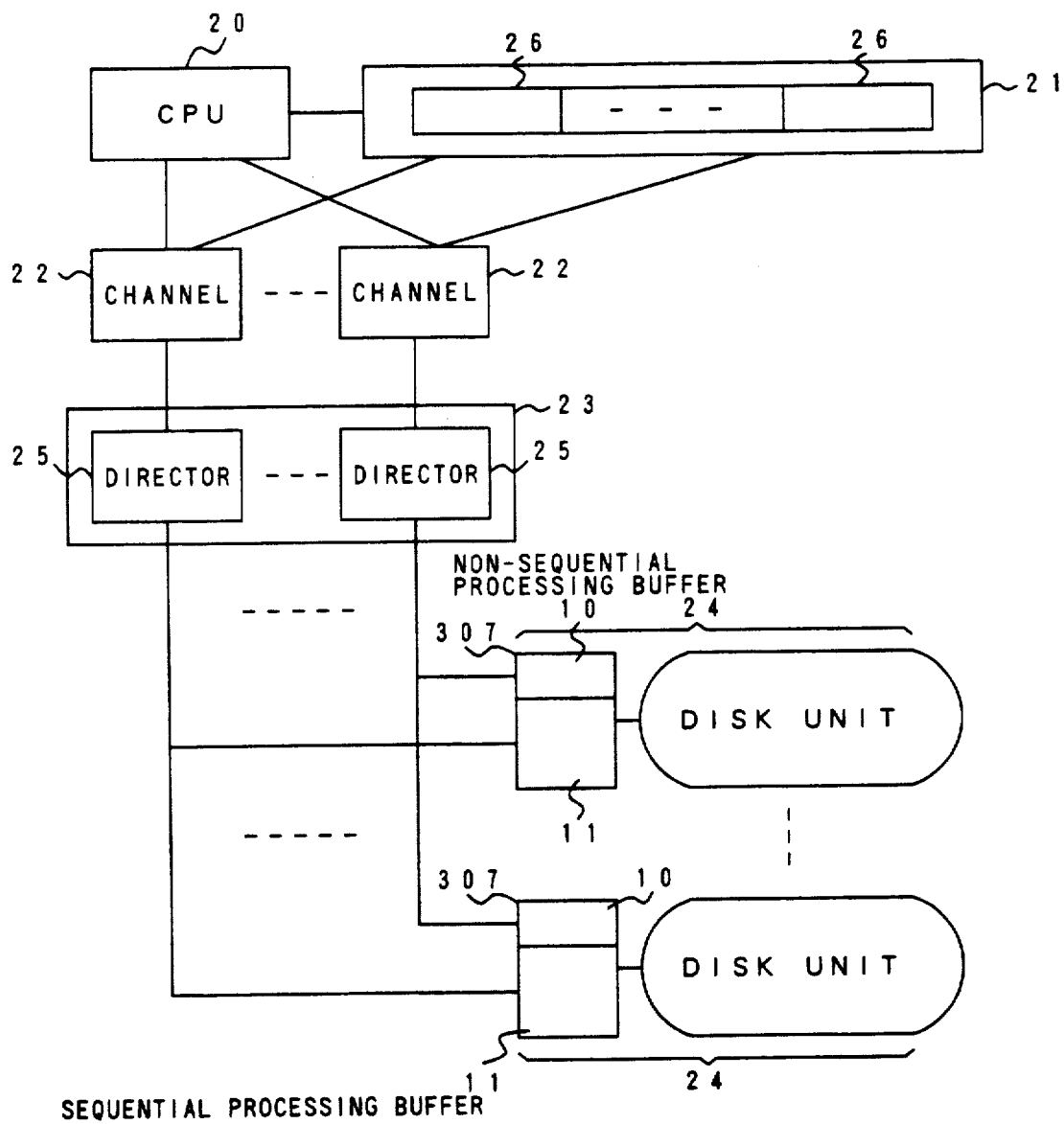
FIG. 1 is a schematic of a computer system in a first embodiment of the present invention.

FIG. 1 is a schematic of a computer system as a first embodiment of the present invention. In FIG. 1, reference numeral 10 denotes a non-sequential processing buffer; 11, a sequential processing buffer; 20, a CPU; 21, a main storage; 22, a channel; 23, a controller; 24, a buffered disk unit; 25, a director; 26, a program; and 307, a buffer.

The controller 23 includes one or more directors 25 each of which transfers data between a channel 25 and the corresponding buffered disk unit 24. The disk units 24 can transfer data to and from the corresponding directors 25 connected thereto.

The main storage 21 stores a plurality of programs 26 which are processed concurrently by the CPU 20.

An input/output request made by a program 26 is delivered to a director 25 of the controller 23 through the corresponding channel 22. The corresponding buffered disk unit 24 performs a locating operation in accordance with a command from the director 25. Thereafter, data is transferred between the disk unit 24 and the main storage 21 through the channel 22 and director 25. Thus, the program 26 reads and writes the necessary data from and into the disk unit 24.

The buffered disk unit 24 of the first embodiment will be described next with respect to FIG. 5 which shows a schematic of the disk unit. In FIG. 5, reference numerals 300 and 301 denote a first processor and a second processor, respectively; 302, a processor interface; 303, a director interface; 304, a plate; 305, a read/write head; 306, a read/write head interface; 307, a buffer; 308, buffer managing information; 309, a first transfer device; 310, a first transfer interface; 311, a first switch; 312, n second transfer devices; 313, a second transfer interface; 314, a second switch; 315, a third transfer device; 316, a third transfer interface; and 317, a third switch.

The first processor 300 controls the transfer of the entire data in the buffered disk unit 24 in accordance with an input/output request from a director 25.

The second processor 301 controls the transfer of data between a read/write head 305 and the buffer 307 in accordance with a command from the first processor 300.

The processor interface 302 stores interface information between the first and second processors 300 and 301 respectively.

The director interface 303 is for the respective directors 25 of the controller 23.

The plate 304 is a medium on which data is recorded and a plurality of (m) plates 304 are provided in a single buffered disk unit 24 in the present embodiment.

Each read/write head 305 reads/writes data from/to the corresponding plate 304. The number of such read/write heads 305 is m in the embodiment.

The read/write head interface 306 seeks a read/write head 304 in accordance with a command from the first or second processor 300 or 301. When the seek operation is completed, the interface 306 informs the first or second processor 300 or 301 of this fact. It also delivers a sector 402 (FIG. 2) below the read/write head 305 to the first or second processor 300 or 301.

The buffer 307 is used to load data to be read sequentially or randomly.

In the buffer managing information 308, information for managing the data stored in the buffer 307 is stored.

The first transfer device 309 transfers data between a read/write head 305 and a director 25 in accordance with a command from the first processor 300. When the data stored in the buffer 307 is ordered to be written by the director 25, it is also written simultaneously in accordance with a command from the first processor 300.

The first transfer interface 310 is for the first transfer device 309 and the first processor 300. More specifically, the first transfer interface 310 is used when the first processor 300 directs the first transfer device 309 to deliver data from a director 25 to the read/write head 305 or from the read/write head 305 to a director 25.

The first switch 311 is controlled by the first processor 300 so as to select a read/write head, and hence to transfer data on the plate 304 corresponding to that head.

A second transfer device 312 loads on the buffer 300 the data read out of a read/write head 305 in accordance with a command from the first or second processor 300 or 301. There are a plurality of such second transfer devices 312, which during one complete rotation of the disks 304, load on onto the buffer 307 the data on the tracks (to be described later in more detail) equal in number to the second transfer devices 312 in one cylinder (to be described later in more detail). Therefore, it is meaningless to increase the number of second transfer devices 312 to more than the number of disks 304. In the present embodiment, the number of second transfer devices 312 is assumed to be n.

The second transfer interface 313 designates a location in the buffer 307 where data is to be loaded.

The second switch 314 determines which of the read/write heads 305 that each of the second transfer devices 312 should read data from. This control is provided by the first or second processor 300 or 301 respectively.

The third transfer device 315 delivers to the director 25 the data read out of the buffer 307 in accordance with a command from the first processor 300.

The first processor 300 determines which portion of the buffer 307 the third transfer interface 316 is to transfer.

The third switch 317 selects either the first or third transfer devices 309 and 315 and one of the directors 25 of the controller 23 such that the first processor 300 can cause the selected transfer device to transfer data to the selected director.

Figure 2:
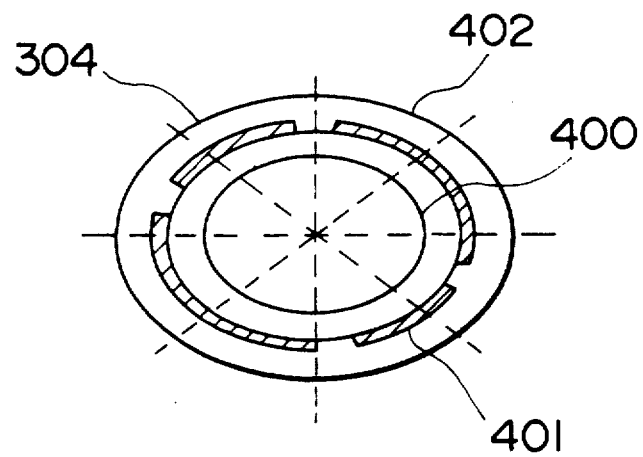
FIGS. 2-4 illustrate a recording medium used in the computer system of FIG. 1.

A recording medium used in the computer system of FIG. 1 will be described next with respect to FIGS. 2-4. In FIG. 2, reference numeral 304 denotes a plate; 400, a track indicative of a recording unit which the read/write head 305 can access during a complete rotation of the plate 304; 401, a record indicative of the minimum data transfer unit transferred between the disk and a director 25; 402, sectors indicative of a unit provided at constant angles using a predetermined position on the plate 304 as a reference.

The sector 402 is used to recognize which azimuth on the rotating disk 304 the read/write head is positioned in.

When a track 400 is used for data input or output, the read/write head 305 is moved to a position where the head is able to access the track, which is referred to as a seek operation. In this case, all the other read/write heads 305 also move simultaneously and not separately.

Figure 3:
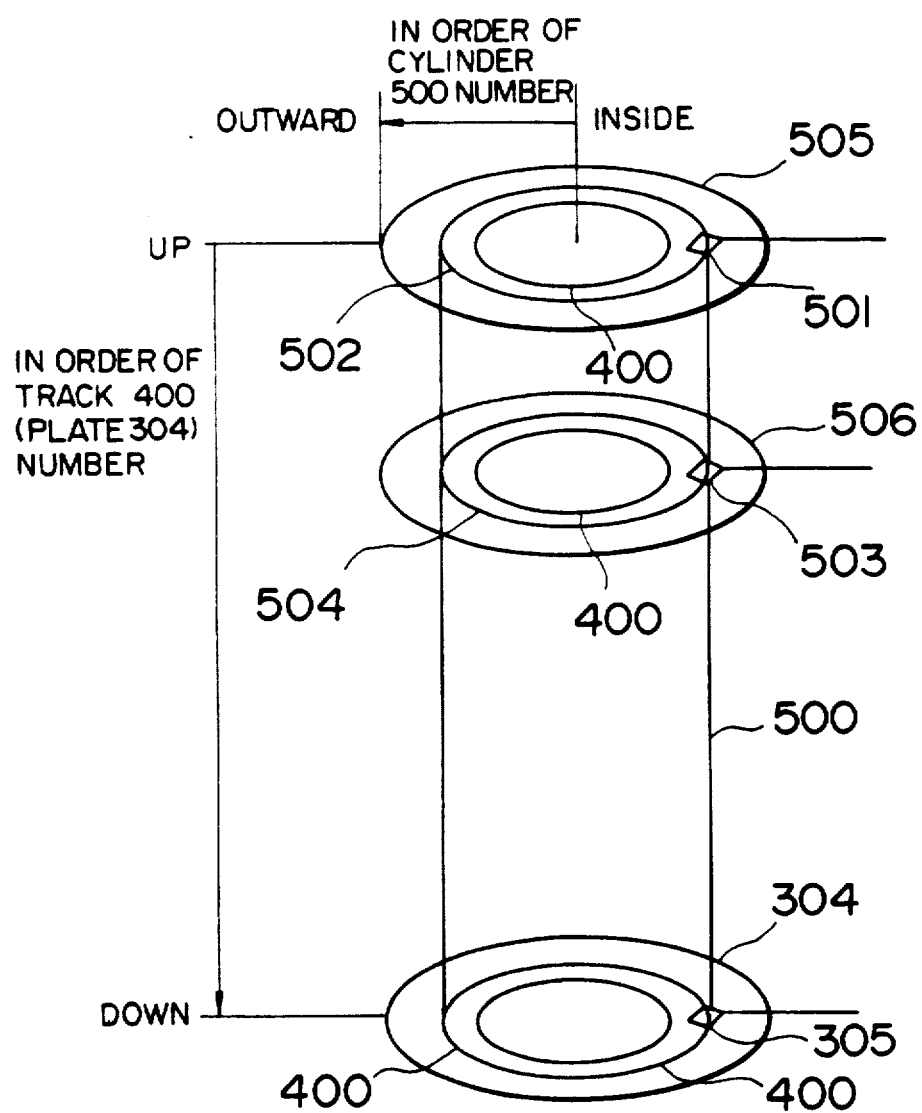

In FIG. 3, reference numeral 305 denotes a read/write head for a buffered disk unit 24; 501, a first read/write head; 503, a second read/write head; 500, a cylinder indicating a collection of tracks on the same periphery (the details of the cylinder will be given later); 505, a first plate; and 506, a second plate.

By designating the cylinder 500, tracks 400 with the respective read/write heads are able to access are determined unconditionally. For example, assume that the first read/write head 501 is at a position on the first plate 505 where it is able to access the first track 502. The second head 503 is on the second plate 506 immediately below the first plate 505 so as to be able to access the second track 504. Similarly, tracks 400 with the other read/write heads 305 are able to access are unconditionally determined. The collection of these tracks is referred to as the cylinder 500.

Therefore, when the director 25 designates a track to and from which data is to be inputted and outputted, it simply designates the sequence number of a desired cylinder 500 and the sequence number of a desired read/write head 305 of that cylinder. The cylinders 500 are numbered outward from inside in an ascending order while the read/write heads 305 are numbered downward from above in an ascending order.

A track present on a plate directly below a different track 400 and belonging to the same cylinder 500 as the first different track 400 is referred to as the track next to the different track 400. For example, the track 400 next to a first track 502 is a second track 504. The track next to the track 400 on the lowermost plate 304 is defined as the one belonging to a cylinder having a sequence number larger by one than the cylinder 500 to which the track 400 belongs and also belonging to the uppermost disk 304. The relation reverse to that mentioned above, namely, the relation of the first track 502 to the second track 504 is defined as the first track 502 being the track preceding the second track 504.

Figure 4:
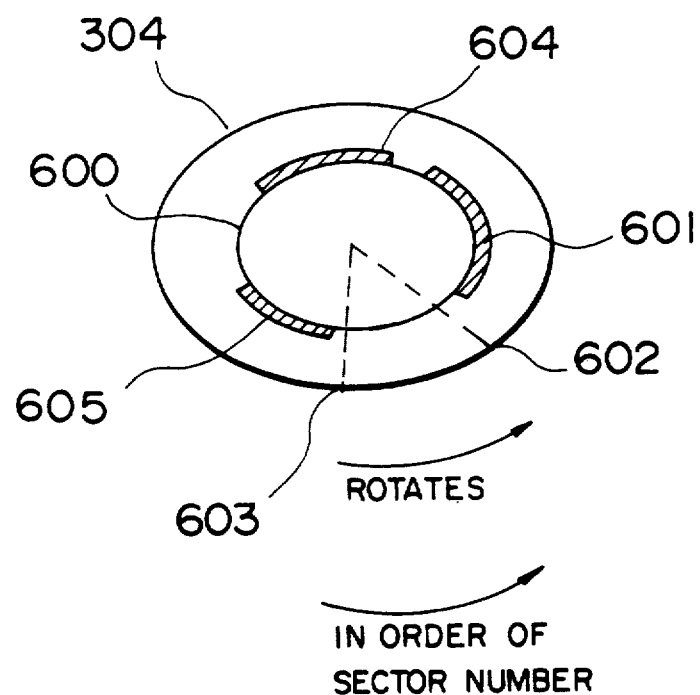

How to determine the sector 402 shown in FIG. 2 is shown in FIG. 4. The reference numeral 600 denotes a third track; 601, a first record; 604, a second record; 605, a third record; 602, a first sector; 603, a predetermined position (base sector (sector 0)) on the plate 304 used for setting the sector 402. The numbers of the sector 402 are given, starting from the base sector 603, in an ascending order in the direction of rotation of the disk 304.

Assume, for example, that the director 25 inputs/outputs a first record 601 on the third track 600. When the read/write head arrives at the position of the first sector 602 directly before the head of the first record 601, the director 25 is informed of such fact. This is referred to as sector setting.

When the director 25 receives from the disk unit 25 information on the completion of the sector setting, it instructs the disk unit to search the record 401, starting from that position. It handles the first record 601 found first as the one to be transferred. Thus, the first record 601 can be handled as an object to be transferred.

Usually, if a plurality of records 401 are to be transferred in accordance with a single input/output request, the one to be transferred next to the first record 601 is a second record 604. If no record 401 is stored between the storage end point of the record 401 and the base sector 603, like the third record 605, the record next to the third record 605 is record 401, stored just behind the base sector 603 of the next track 400.

The sequential process is defined as an input/output process where a record 401 next to the record 401 transferred at the end of an input/output request is the one to be first transferred at the next input/output request.

Figure 6A:
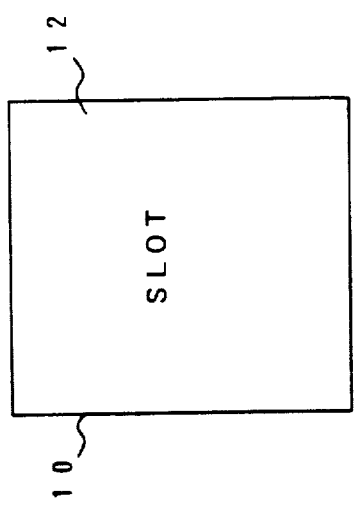
FIGS. 6A and 6B illustrate a buffer of the first embodiment.
Figure 6B:
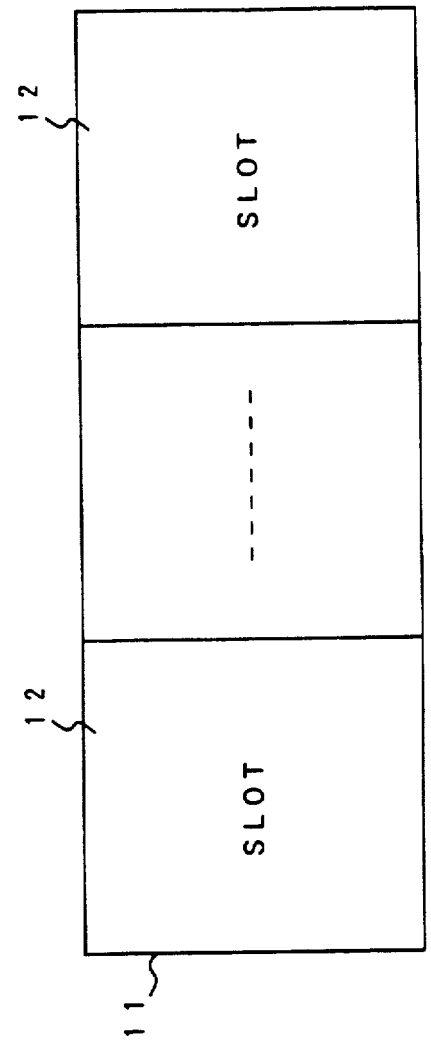
Figure 7:
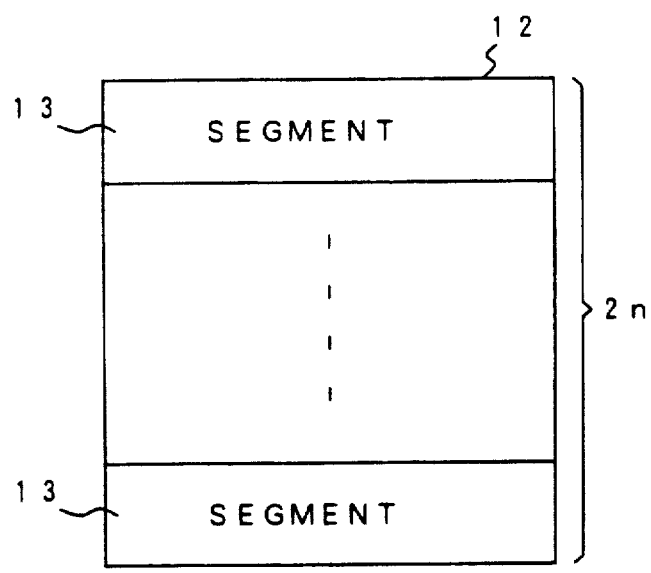
FIG. 7 illustrates 2n slots 12 in the first embodiment.

The structure of the buffer 307 will next be described. FIGS. 6A and 6B illustrate a buffer of the first embodiment of the present invention. FIG. 7 illustrates slots 12 in the first embodiment of the present invention.

In FIGS. 6A and 6B, reference numeral 10 denotes a buffer used for random processing allocated to non-sequential reading; 11, a buffer used for sequential processing allocated to sequential reading; 12, an allocation unit (slot) of the buffer 307 allocated to reading.

In the particular embodiment, as shown in FIG. 6A, the random processing buffer 10 includes a single slot. As shown in FIG. 6B, the sequential processing buffer includes a plurality of slots 12.

In FIG. 7, reference numeral 13 denotes a storage unit (segment) storing data on a single track. In the present embodiment, the slot 12 includes a plurality of segments 13, the number of which is 2n or twice as many as the n second transfer devices 312.

Transfer of data by use of the buffer 307 will be described. FIGS. 8A and 8B illustrate data transfer in the first embodiment. In the present invention, when a read request such as is not completed unless the plate 304 is rotated through more than one complete rotation is executed, data transfer is performed in the order of FIGS. 8A and 8B.

As shown in FIG. 8A, data is loaded through the n second transfer devices 312 in a first group 72 which consists of the segments 13 from first segments 70 to a second segment 71. The record loaded at the last location in the second segment 71 is referred to as the last record 76 in the first segment group.

Thus, when transfer of a quantity of data for one complete rotation of the plate is completed, a quantity of data for the next one rotation is transferred, as shown in FIG. 8B. Namely, the n second transfer devices 312 transfer data to a second segment group 75 which consists of the segments 13 from third segments 73 to a fourth segment 74. The record 401 stored at the last location in the fourth segment 74 is referred to as the last record 77 in the second segment group.

Simultaneously with these operations, the third transfer device 315 transfers to the director 25 the data stored in the first segment group 72. If the third transfer device 315 is n times as high in speed as the second transfer device 312, the third transfer device 315 can send to the director 25 all of the data in the first segment group 72 while the n second transfer devices 312 are loading data in the second segment group 75. If a read request further causes data to be read out, the second transfer devices 312 load data in the first segment group 72 during the next rotation. By repeating the above operations, the data having of any length is are read at a transfer speed which is n times as high as the second transfer device 312. The speed of the third transfer device 315 is not required to be restricted to n times the speed of the second transfer devices 312. If the speed of the third transfer device 315 is selected so as to be higher than the speed of of the second transfer devices and lower than n times the speed of the second transfer devices, a throughput equal to the speed of the third transfer device 315 can be obtained. Thus, the throughput obtained is larger than that obtained by a single second transfer device 312.

While the reading process is illustrated in the present embodiment, the write process will produce similar effects.

Figure 9:
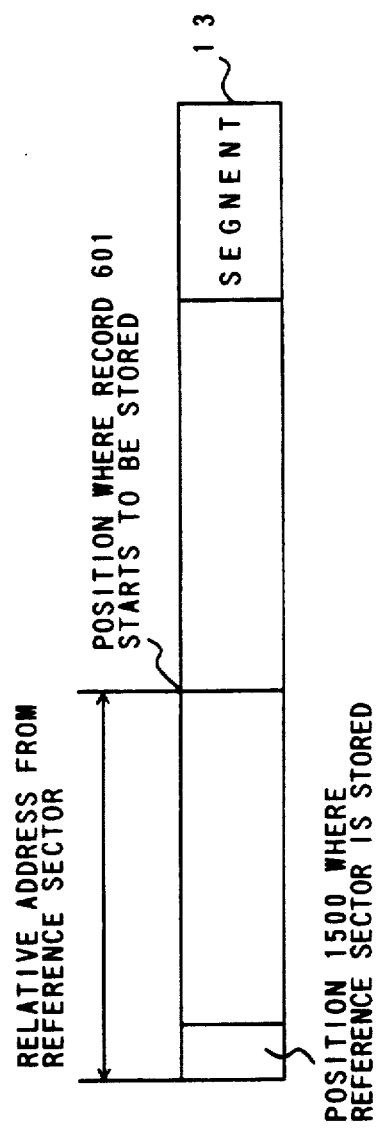
FIG. 9 illustrates data loaded in a segment 13 in the first embodiment.

The form of data loaded in a segment 13 of FIG. 7 in the first embodiment will be described next with respect to FIG. 9. In FIG. 9, reference numeral 1500 denotes a location (address 0) where the base sector 603 of FIG. 4 is stored.

In the present embodiment, data on the track 400 of FIG. 4 is shown loaded in the segment 13. In this case, the data on the base sector 603 are loaded from the location 1500 at address 0 in the segment 13.

When one of the FIG. 5 second transfer devices 312 receives from the second processor 301 a request for loading data on the track 400, that second transfer device 312 loads data starting from the head of the first found record 401 in the segment 13. At this time, the respective addresses where the records 401 are stored are equal to the relative addresses from the base sector 603 of the track 400.

By employing such type of loading, the respective addresses in the segment 13 where the records 401 are stored are equal to the addresses on the track 400 even if loading data in the segment 13 may be started from any location on the track 400.

If a request is newly issued to the track 400 where the data is already loaded in the segment 13, the segment 13 is searched starting with an address corresponding to the number of a given sector 402. Thus a record 401 can be found which is the same as that obtained by searching the disk 304.

The structure of the buffer managing information 308 of FIG. 5 will be described next.

Figure 10:
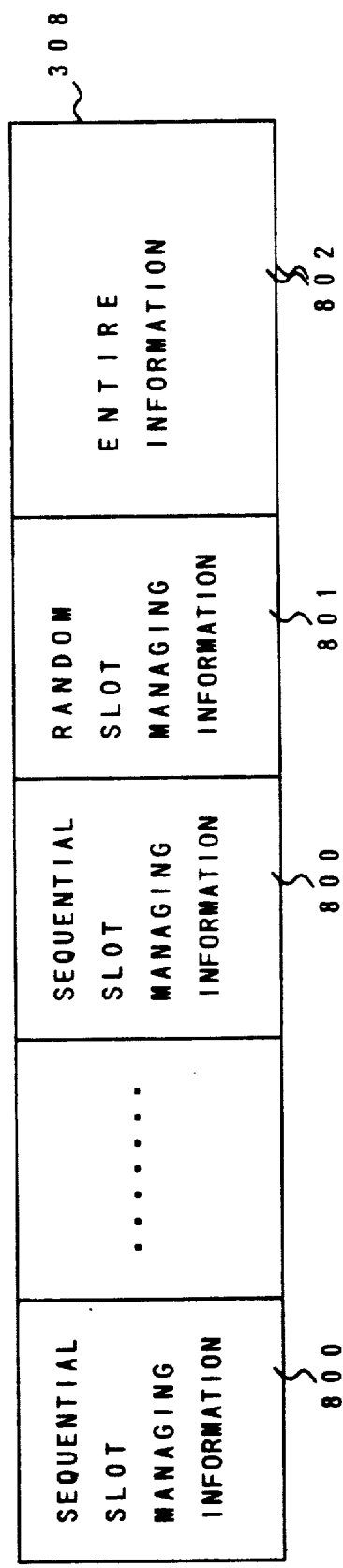
FIG. 10 illustrates the buffer managing information 308 in the first embodiment.
Figure 11:
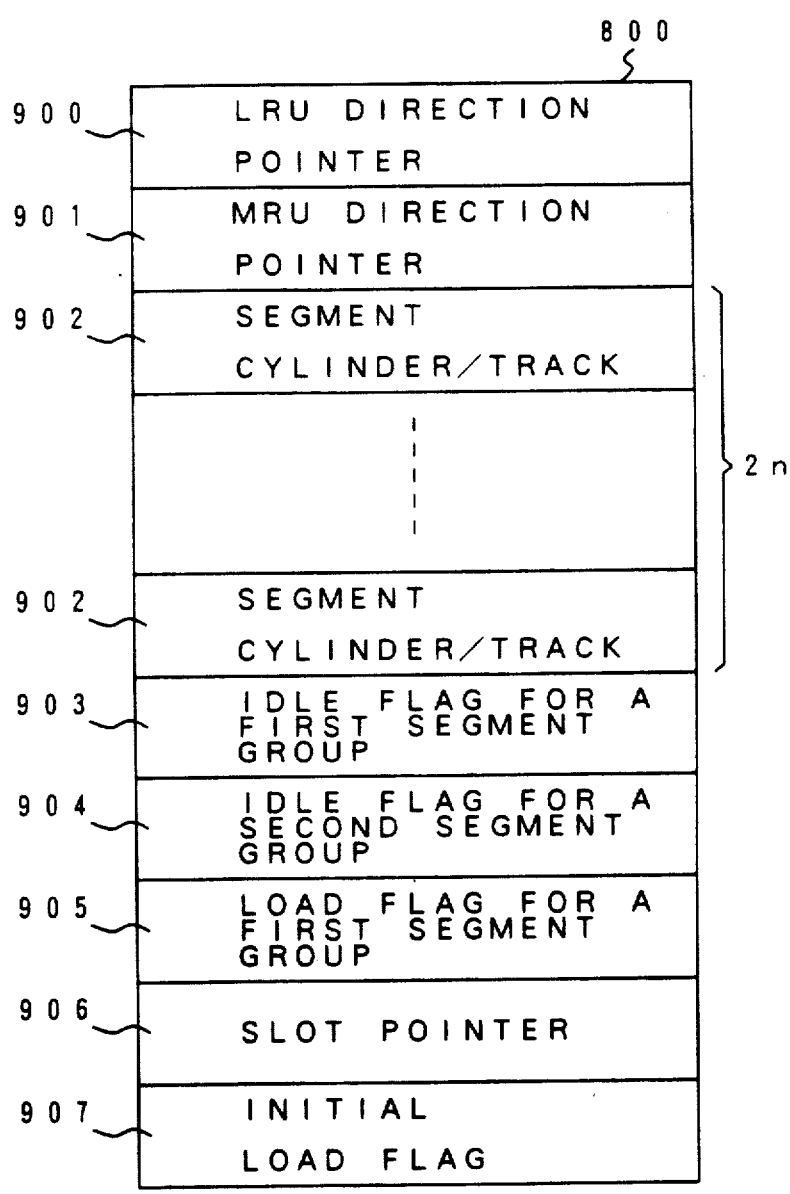
FIG. 11 illustrates the sequential slot managing information 800 in the first embodiment.
Figure 12:
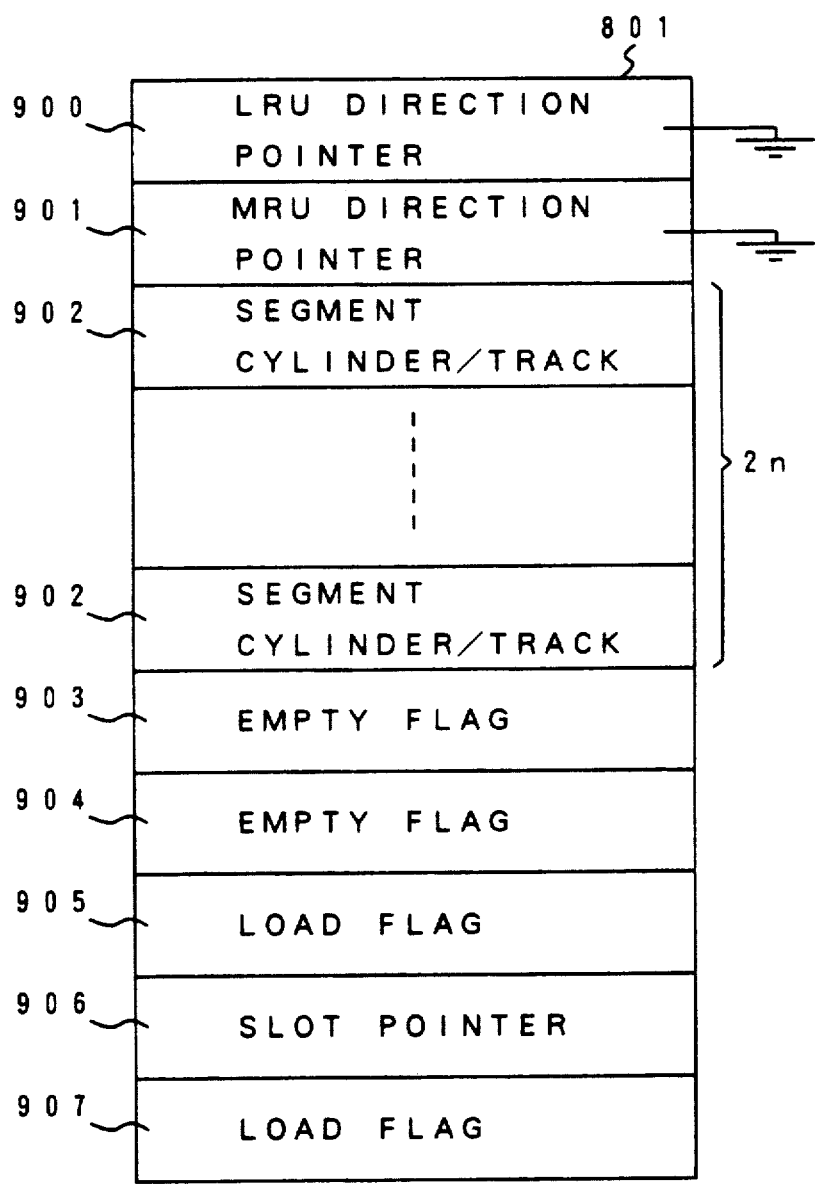
FIG. 12 illustrates the random slot managing information 801 in the first embodiment.
Figure 13:
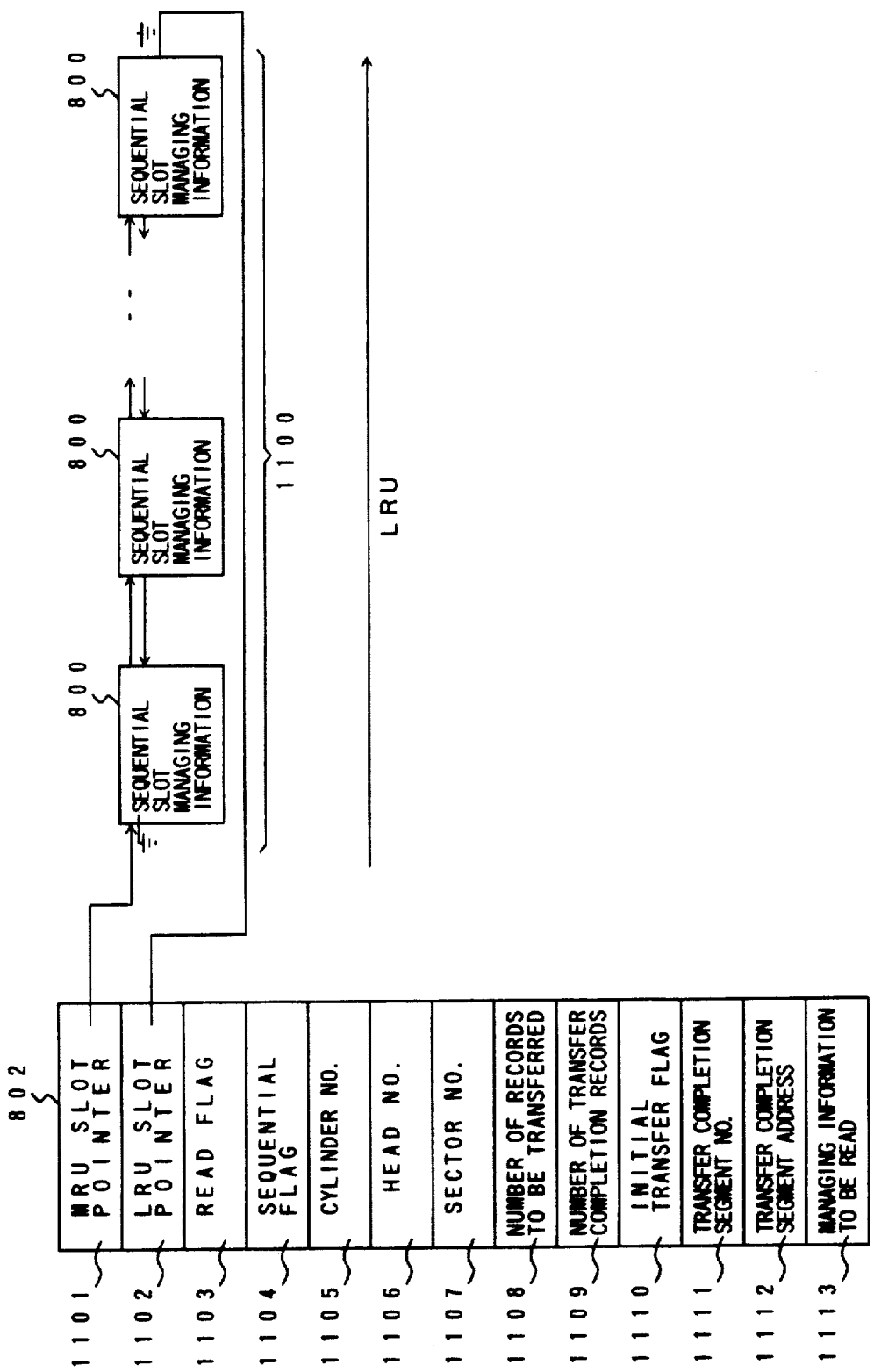
FIG. 13 is a schematic of the structure of the entire information 802 and an LRU queue 1100 for sequential slot managing in the first embodiment.

FIG. 10 illustrates the buffer managing information 308 in the first embodiment; FIG. 11 illustrates the sequential slot managing information 800 in the first embodiment; FIG. 12 illustrates the random slot managing information 801 in the first embodiment; and FIG. 13 illustrates the structure of the entire information 802 and the structure of an LRU queue 1100 for sequential slot managing in the first embodiment.

In FIG. 10, reference numeral 800 denotes the sequential slot managing information corresponding to a slot 12 in the sequential processing buffer 11 of FIG. 6B; 801, the random slot managing information for managing a single slot 12 in the random processing buffer 10 of FIG. 6A; and 802, the entire information. A single piece of such entire information exists in the buffer managing information 308. The sequential slot managing information 800 and the random slot managing information 801 are together referred to as the slot managing information.

The structure of the sequential slot managing information 800 is illustrated in FIG. 11. In FIG. 11, reference numeral 900 denotes an LRU direction pointer; 901, an MRU (Most Recently Used) direction pointer; 902, a segment cylinder/track; 903, an idle flag for a first segment group; 904, an idle for a second segment group; 905, a load flag for a first segment group; 906, a slot pointer; and 907, an initial load flag.

The pieces of sequential slot managing information 800 in the present embodiment are arranged in order of LRU or in order of time of reception of a read request. Alternatively, they may be arranged in order of time of a reception data input/output request reception, inclusive of a write request.

The LRU direction pointer 900 is a pointer to the sequential slot managing information 800 which is not read for the next longest time, to the present sequential slot managing information.

The MRU direction pointer 901 is a pointer to sequential slot managing information which is not read from the next shortest time to the present sequential slot managing information.

Each segment cylinder/track 902 indicates the number of the track 400 where data should be stored in a respective one of the segments 13. Therefore, the number of segment cylinders/tracks 902 is 2n which is the number of segments 13 in a single slot 12.

The first segment group empty flag 903 indicates that the entire first segment group 72 of FIG. 8 is empty or that the entire data of the first segment group 72 has been sent to the director 25. Similarly, the second segment group 75 empty flag 904 indicates that the second segment group 75 is empty or that the entire data of the second segment group has been sent to the director 25.

A first segment group load flag 905 indicates that the last loading processing is executed into the first segment group 72 and not into the second segment group 75. A slot pointer 906 is a pointer to a slot 12 corresponding to the sequential slot managing information 800.

A sequential load flag 907 is not turned on until data is first loaded after the sequential slot managing information 800 is allocated to the new sequential reading.

FIG. 12 shows the structure of the random slot managing information 801 of FIG. 10. The random slot managing information 801 in the present embodiment cannot be arranged in an LRU sequence because the number of its pieces is only one. Thus, unlike the sequential slot managing information 800 of FIG. 1, the information 801 includes 2n segment cylinders/tracks 902, and a first segment group empty flag 903, a second segment group empty flag 904, a first segment group load flag 905, slot pointer 906 and an initial load flag 907.

FIG. 13 shows the entire information 802 of FIG. 10. In FIG. 13, reference numeral 110 denotes an LRU queue; 1101, an MRU slot pointer; 1102, an LRU slot pointer; 1103, a read flag; 1104, a sequential flag; 1105, a cylinder No.; 1106, a head No.; 1107, a sector No.; 1108, the number of records to be transferred; 1109, the number of transfer completion records; 1110, an initial transfer flag; 1111, a transfer completion segment No.; 1112, a transfer completion segment address; and 1113, the managing information to be read.

The MRU slot pointer 1101 points to the sequential slot managing information 800 which was read last.

The LRU slot pointer 1102 points to the sequential slot managing information 800 which has not been read for the longest interval of time.

The read flag 1103 indicates that the input/output processing request received from the director 25 is a read request.

The sequential flag 1104 indicates that the input/output processing request received from the director 25 is a sequential processing request.

The cylinder No. 1105 indicates a cylinder 500 where the record 401 to be first transferred in accordance with the received input/output processing request is stored while the head No. 1106 indicates a track determined by a read/write head 305.

The sector No. 1107 indicates a sector 402 where a record 401 to be first transferred is stored.

The number of records to be transferred 1108 indicates the number of records 401 to be transferred in accordance with the received input/output processing request.

The number of transfer completion records 1109 indicates the number of records 401 transferred to the director 25 in the course of execution of the received data input/output request.

The initial transfer flag 1110 indicates that the transfer of the record 401 is the first one made by the received input/output request.

The transfer completion segment No. 1111 indicates the identifier of a segment 13 where the record 401 which has been transferred to/from the director 25 is stored. The transfer completion segment address 1112 indicates an end address of the record 401 which has been transferred to/from the director is completed.

The read managing information 1113 is a pointer to the sequential slot managing information 800 or the random slot managing information 801 to the read actually.

Therefore, if a plurality of records 401 is to be transferred, for example, by a single input/output request, the transfer of the second and subsequent records 401 is performed as follows. A record 401 to be transferred is searched from the position where the record 401 last transferred is stored, using the transfer completion segment No. 1111 and the transfer completion segment address 1112. Thereafter, the record 401 first found is handled as being transferred.

The operation of the LRU queue 1101 will be described with reference to FIGS. 14A, 14B and FIGS. 15A and 15B.

11

Figure 14A:
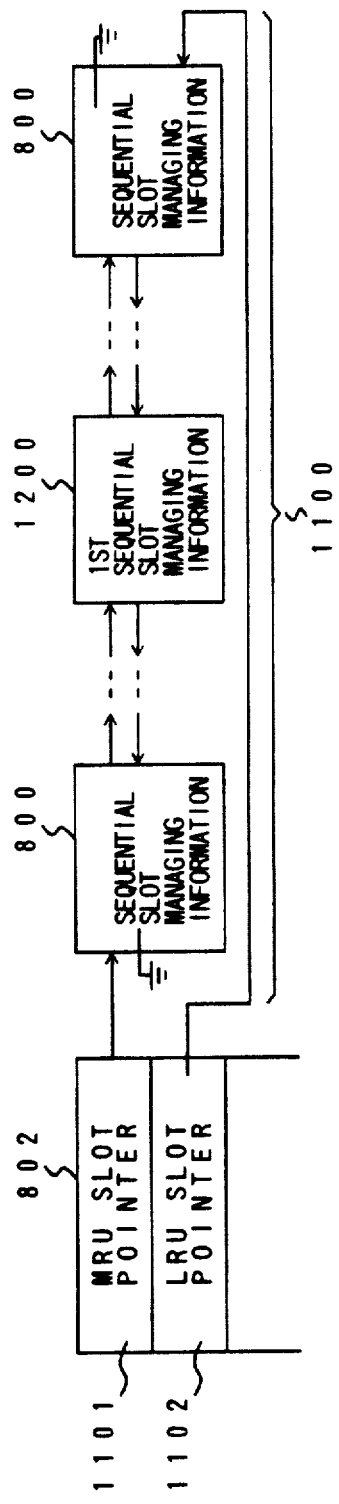
FIGS. 14A and 14B illustrate a process of operating the LRU queue 1100 performed when a sequential read request having already allocated a slot 12 is accepted in the first embodiment.
Figure 14B:
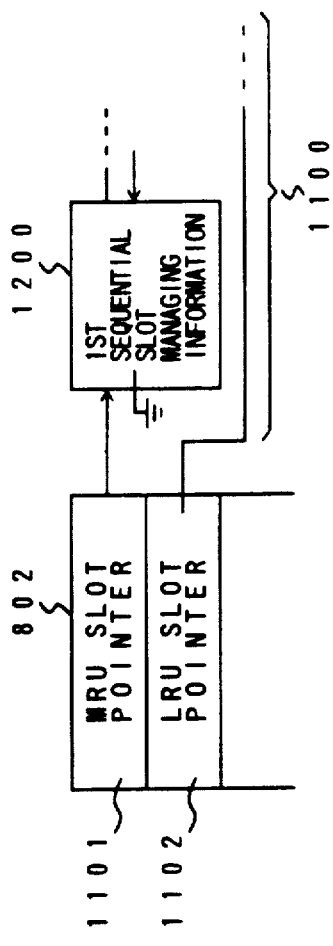

FIGS. 14A and 14B illustrate the operation of the LRU queue 1100 performed when a sequential reading request to which a slot 12 is already allocated is received in the first embodiment of the present invention.

In FIG. 14, reference numeral 1200 denotes the first sequential slot managing information corresponding to a slot 12 to be read.

FIG. 14A illustrates the state of the LRU queue 1100 before the sequential reading request is received. In this case, the first sequential slot managing information 1200 is already allocated to the received sequential reading.

FIG. 14B illustrates the state of the LRU queue 1100 when the sequential reading is completed. In this case, the first sequential slot managing information 1200 is the one which was handled as being read last. Therefore, it is moved to the position indicated by the MRU slot pointer 1101.

FIGS. 15A and 15B illustrate how to operate the LRU queue 1100 when a sequential read request in which no slot is allocated is received in the first embodiment.

In FIG. 15, reference numeral 1300 denotes a second sequential slot managing information indicated by the LRU slot pointer 1102.

FIG. 15A illustrates the state of the LRU queue 1100 before the sequential reading request is received. In this case, the second sequential slot managing information 1300 indicated by the LRU slot pointer 1102 is allocated to the received sequential reading request.

FIG. 15B shows that the second sequential slot managing information 1300 is modified as indicated by the MRU slot pointer 1101 after the sequential reading is completed.

Figure 16:
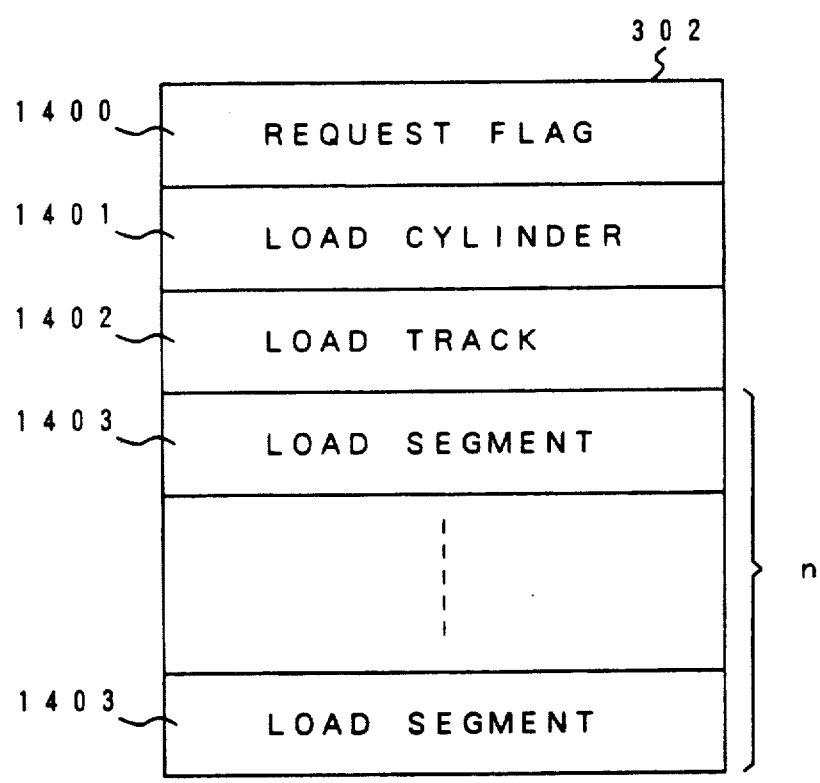
FIG. 16 illustrates a processor interface 302 in the first embodiment.

The processor interface 302 shown in FIG. 5 will be described with reference to FIG. 16. In FIG. 16, reference numeral 1400 denotes a request flag; 1401, a load cylinder; 1402, a load track; and 1403, a load segment.

The request flag 1400 is a bit indicating that the first processor 300 requests the second processor 301 to read data on the disk 304 for one complete rotation.

The load cylinder 1401 indicates a cylinder 500 the data on which should be read.

The load track 1402 designates a track 400 where the loading process starts.

The number of load segments 1403 is n and each load segment 1403 designate corresponding segments 13 in which pieces of data on the n tracks 400 to be read are loaded.

Figure 17:
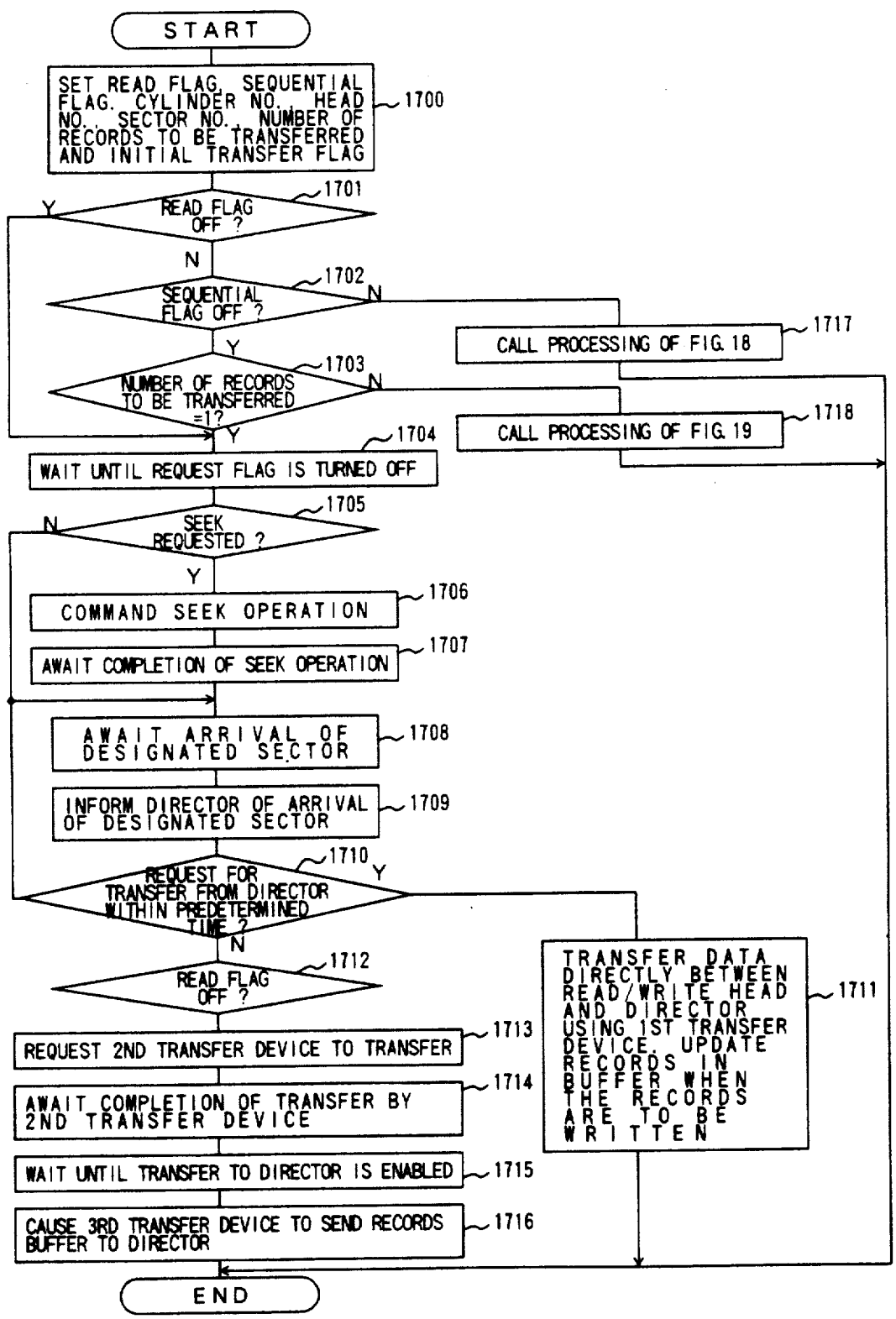
FIG. 17 is a flowchart indicative of the operation of a first processor 300 of the first embodiment performed when the processor has received an input/output request from a director 25.

The operation of the first and second processors 300 and 301 of FIG. 5 will be described with reference to FIGS. 17-23. FIG. 17 is a flowchart indicative of the processing of the first processor 300 performed when the first processor 300 in the first embodiment has received an input/output request from a director 25. In the present embodiment, when the first processor 300 receives an input/output request from the director 25 through the director interface 303, it sets information on the input/output request in the entire information 802 of FIG. 10 (1700). In the present embodiment, the first processor 300 receives from the director 25 information on the following:

(1) discrimination between read and write;
(2) discrimination between sequential processing and other processing;
(3) cylinder No.;
(4) head No.;
(5) sector No.; and
(6) the number of records to be transferred.

12

If the input/output request received by the first processor 300 is for reading, the first processor turns on the read flag 1103 of FIG. 13. If the received input/output request is for writing, the first processor turns off the read flag 1103. If the received input/output request is for sequential processing, the first processor turns on the sequential flag 1104. If otherwise, the first processor turns off the sequential flag 1104. The first processor intactly sets data on the cylinder No. 1105, the head No. 1106, the sector No. 1107 and the number of records to be transferred 1108 received from the director 25. The first processor further turns off the initial transfer flag 1111 and sets the number of transfer completion records 1109 to 0.

In this case, the data to be inputted/outputted is determined by the received cylinder No. 1105 and the head No. 1106. The starting point of the data input/output is the record 401 on the sector 402 directly after the sector No. 1107 on the track 400. A collection of consecutive records starting with and subsequent to that record 401 and equal in number to the number of the records to be transferred is to be inputted/outputted.

It is then checked whether the read flag 1103 is off or not (step 1701).

As a result, if the read flag 1103 is off or the received input/output request is for writing, a jump is made to step 1705. If it is for writing, the buffer 308 is not used and data transfer is performed, using the first transfer device 309, directly between the disk 304 and the director 25 concerned.

Figure 18:
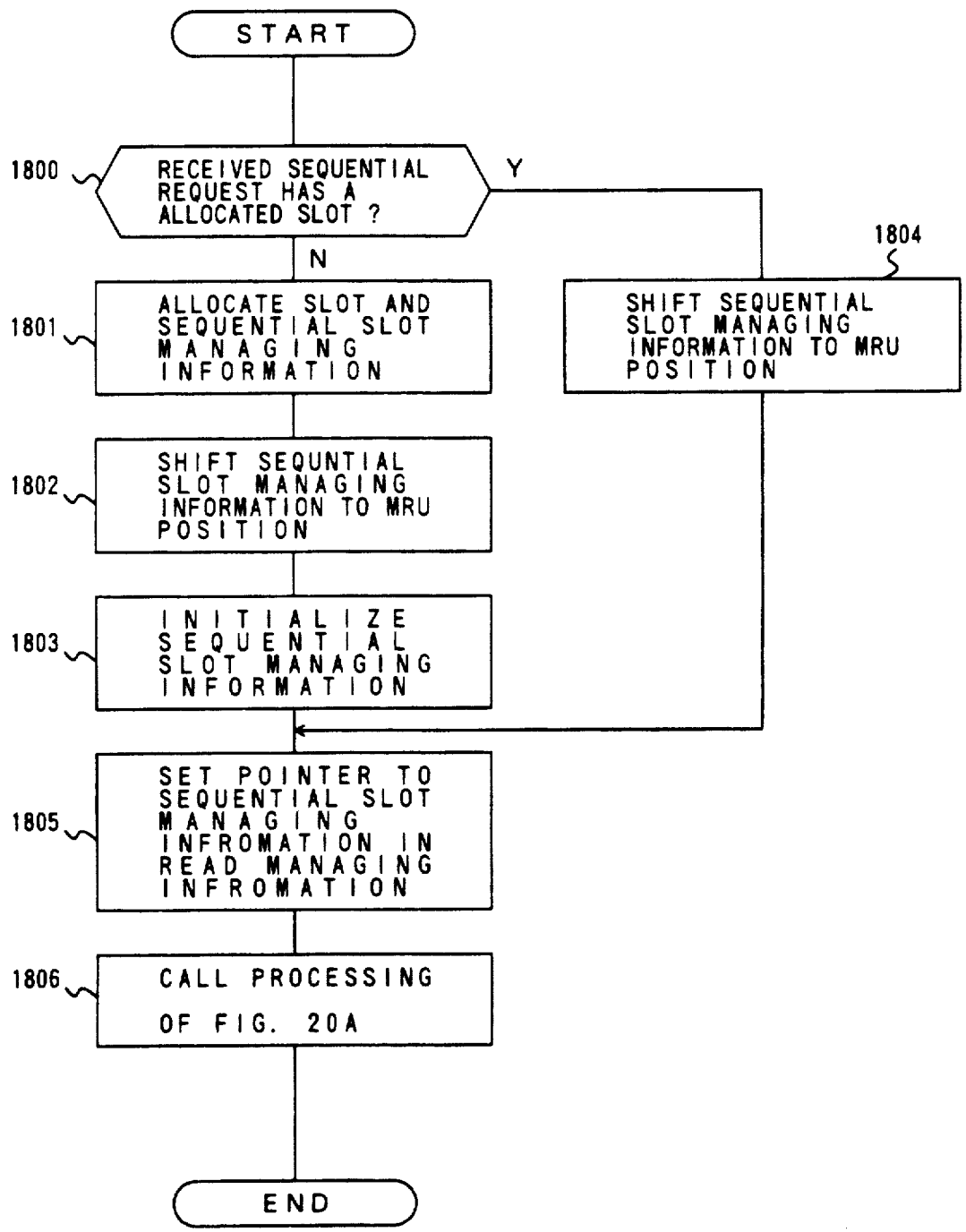
FIG. 18 is a flowchart indicative of the operation of the first processor 300 performed when the processor has received a sequential read request in the first embodiment.

If the read flag 1103 is on, it is checked whether the sequential flag 1104 is on (step 1702). If so, the processing of FIG. 18 is called (step 1717). If the received input/output request is for sequential reading, data to be read is read into the buffer 308 and then transferred to the director 25.

It is then checked whether the number of records to be transferred 1108 is 1 (unity) if the received request is for other than sequential transfer (step 1703). Of course, another substitution may be permitted to check if the number of records to be transferred 1108 is less than a specified value in step 1703.

Figure 19:
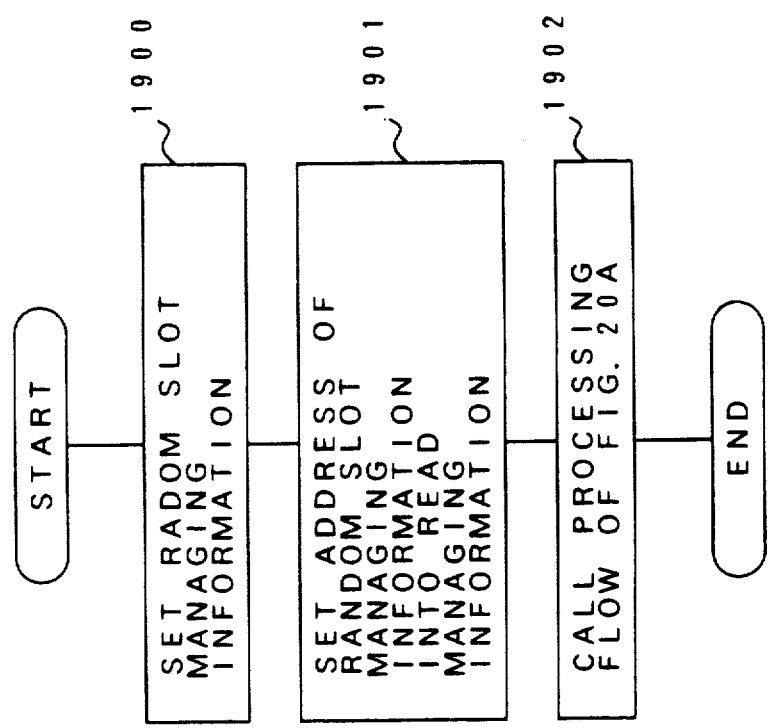
FIG. 19 is a flowchart indicative of the operation of the first processor 300 when the processor has received a non-sequential read request for reading two or more records in the first embodiment.

As a result, if the number of records to be transferred 1108 is 2 or more, data should temporarily be loaded on the buffer 307 using the n second transfer devices 313 to achieve more efficient processing. Therefore, the processing flow of FIG. 19 is called (step 1718).

Otherwise, the following specified input/output processing starts. In step 1703, if the number of records to be transferred is 1 (unity), a request flag 1400 is checked to see whether the second processor 301 is loading data on the buffer 307 and waits until the request flag 1400 is turned off (step 1704).

At step 1705, the position of the cylinder 500 below the current read/write head 305 is confirmed through the read/write head interface 306 and its value is compared with the cylinder No. 1105.

If the value does not coincide with the cylinder No. 1105, the read/write head 305 is required to perform a seek operation through the read/write head interface 306 (step 1706). The completion of the seek operation is awaited (step 1707).

The number of the sector 402 below the read/write head 305 is read through the read/write head interface 306 (step 1708). This operation continues until the number of the sector below the read/write head 305 coincides with the sector No. 1707, in which case the fact that the read/write head 305 is at the position of the sector 402 indicated by the designated sector No. 1107 is reported to the director 25 using the director interface 303 (step 1709).

Arrival of a transfer request from the director 25 is awaited for a predetermined time (step 1710).

If the transfer request from the director 25 arrives, the following operation is performed at step 1711. Transfer of data is made directly between the director 25 and the read/write head 305 using the first transfer device 309. If the record 401 stored in the buffer 307 is ordered to be written by the director 25, the record 401 in the buffer 307 is also updated.

If no transfer request arrives from the director 25 at step 1710, the following operation is performed. If the read flag 1103 is off, indicating that the received input-/output request is for writing (step 1712), a jump is made to step 1709 in order to wait for one more rotation of the disk 304.

If the read flag 1103 is on (step 1712), the following operation is performed at step 1713. Data is loaded in the segments of a slot designated by the slot pointer 906 in the random slot managing information 801 shown in FIG. 12. A track corresponding to the cylinder No. 1105 and head No. 1106 is then searched. Thereafter, a transfer command is given to an appropriate one of the n second transfer devices 313 such that the first found record 401 is transferred.

The completion of transfer of the second transfer device 313 is awaited (step 1714). If the transfer of that second transfer device 313 is completed, await is had until transfer from/to the director 25 becomes possible through the director interface 303 (step 1715).

If transfer from/to the director 25 becomes possible, the following operation will be performed at step 1716. Data is delivered to the director 25 from the segment 13 of the slot 12 indicated by the slot pointer 906 in the random processing slot managing information 801. Thus, the reading process is completed.

The details of the step 1717 of FIG. 17 will be described with reference to FIG. 18, which is a flowchart indicative of the processing of the first processor 300 performed when the first processor receives a sequential read request.

In the present embodiment, all the segment cylinders/tracks 902 of the sequential slot managing information 800 are searched (step 1800). By such searching, it is checked whether the received sequential read processing request has already been allocated a slot 12. More specifically, the cylinder No. 1105 and head No. 1106 of the received input/output request coincides with those of a segment cylinder/track 902.

As a result, if allocated, a jump is made to step 1804. If not, the following process is performed at step 1801. The sequential slot managing information 800 indicated by the LRU slot pointer 1107 is handled as being allocated. This implies that the slot 12 indicated by the slot pointer 906 in the sequential slot managing information 800 should be allocated to the received sequential read request.

As shown in FIGS. 15A and 15B, the sequential slot managing information 800 allocated to the received sequential reading process is shifted to the location indicated by the MRU slot pointer 1101 (step 1802).

Information is then set in the sequential slot managing information 800 (step 1803). More specifically, the first and second segment group empty flags 903 and 904 are turned on. Further, the first segment group load flag 905 is turned on. Furthermore, the initial load flag 907 is turned on. Thereafter, a jump is made to step 1805.

If a slot 12 is already allocated (step 1800), the sequential slot managing information 800 allocated to the received sequential reading request is shifted to the position indicated by the MRU slot pointer 1101 in accordance with the operation of the LRU queue 1100 shown in FIGS. 14A and 14B (step 1804).

At step 1805, the pointer to the sequential slot managing information 800 allocated to the received sequential reading request is set the read managing information 1112.

Figure 20A:
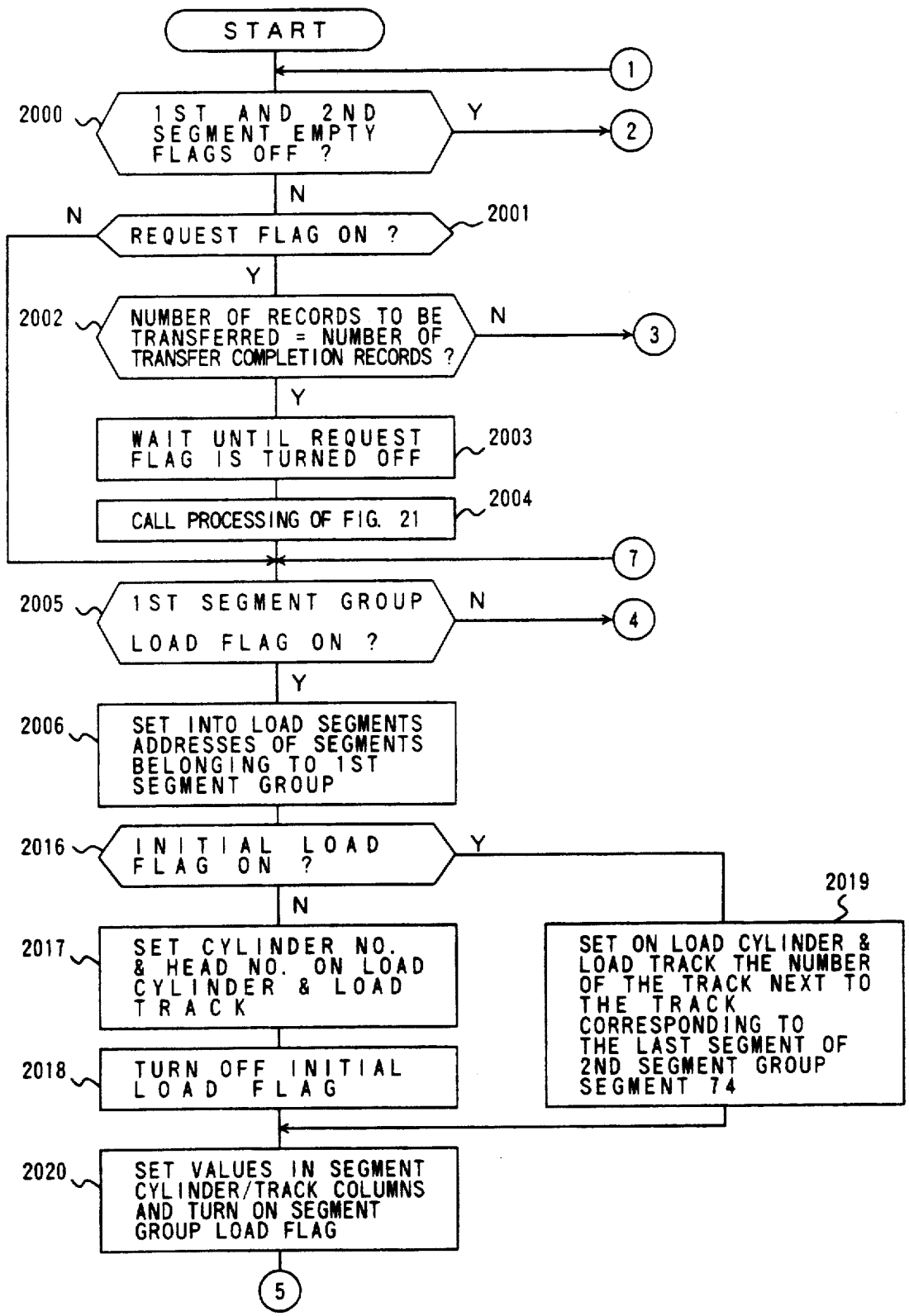
FIGS. 20A and 20B are flowcharts indicating read operation of the first processor 300 using a buffer.
Figure 20B:
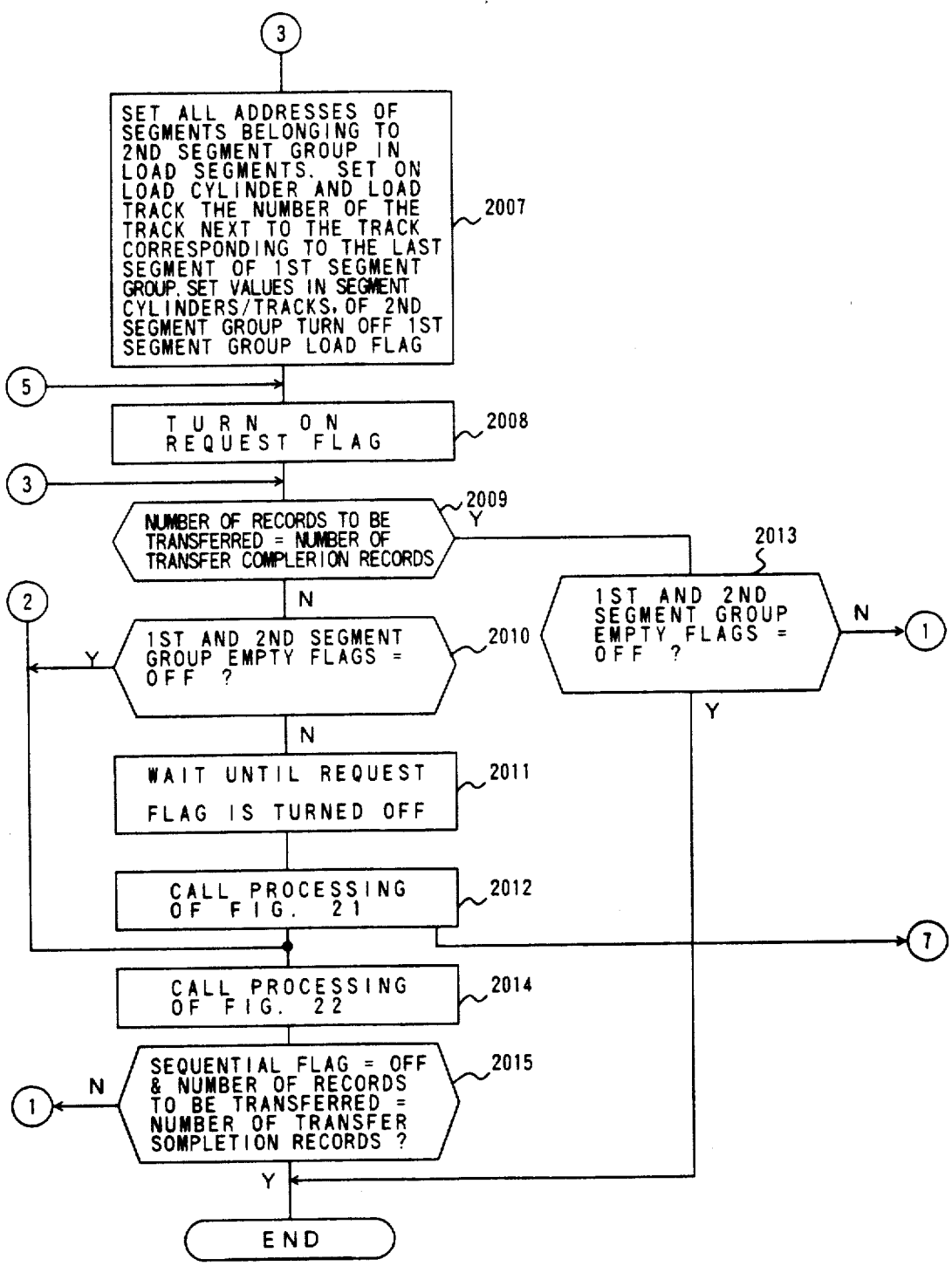

A process flow shown in FIGS. 20A and 20B is called in order to enter into a specific transfer (step 1806).

The details of the step 1718 of FIG. 17 will be described with reference to FIG. 19, which is a flowchart indicative of the processing of the first processor 300 performed when the first processor 300 has received a non-sequential reading request for reading two or more records in the first embodiment of the present invention. Of course, as previously described, another substitution should be permitted in which FIG. 19 is called when the first processor 300 has received a non-segment reading request for reading more than the specific number of records.

In the present embodiment, first, initial information is set in the random slot managing information 801 (step 1900). More specifically, the first and second empty flags 903 and 904 are turned on. Further, the first segment group load flag 905 and the initial load flag 907 are turned on.

The pointer to the random slot managing information 801 is set in a read slot 1113 (step 1901).

The processing shown in FIGS. 20A and 20B is called in order to enter into a specific reading process (step 1902). The details of the step 1902 of FIG. 19 will be described with reference to FIGS. 20A and 20B which are flowcharts indicative of the reading operation of the first processor 300 using the buffer in the first embodiment.

The slot in which data to be read in the particular embodiment is loaded is a slot 12 corresponding to the read managing information 1113 of FIG. 13. Therefore, if the respective pieces of information in the sequential slot managing information 800 of FIG. 11 or the random slot managing information 801 of FIG. 12 are described, those process of information represents the one in the slot managing information pointed by the read managing information 1113. If the components in the slot 12 shown in FIGS. 8A and 8B are described, they represent the components in the slot 12 corresponding the read managing information 1113. This applies not only in FIGS. 20A and 20B but also in FIGS. 21, 22 and FIGS. 26A and 26B to be described later in more detail.

In the present embodiment, if the first and second group empty flags 903 and 904 are both on (step 2000), a jump is made to step 2014.

If one of the flags is off, it is checked whether the request flag 1400 of FIG. 16 is on (step 2001).

As a result, if the request flag 1400 is off, a jump is made to step 2005.

In step 2002 shown in FIG. 20A, it is noted that the description in relation with step 2009 in FIG. 20B is omitted since the process is obvious.

Figure 21:
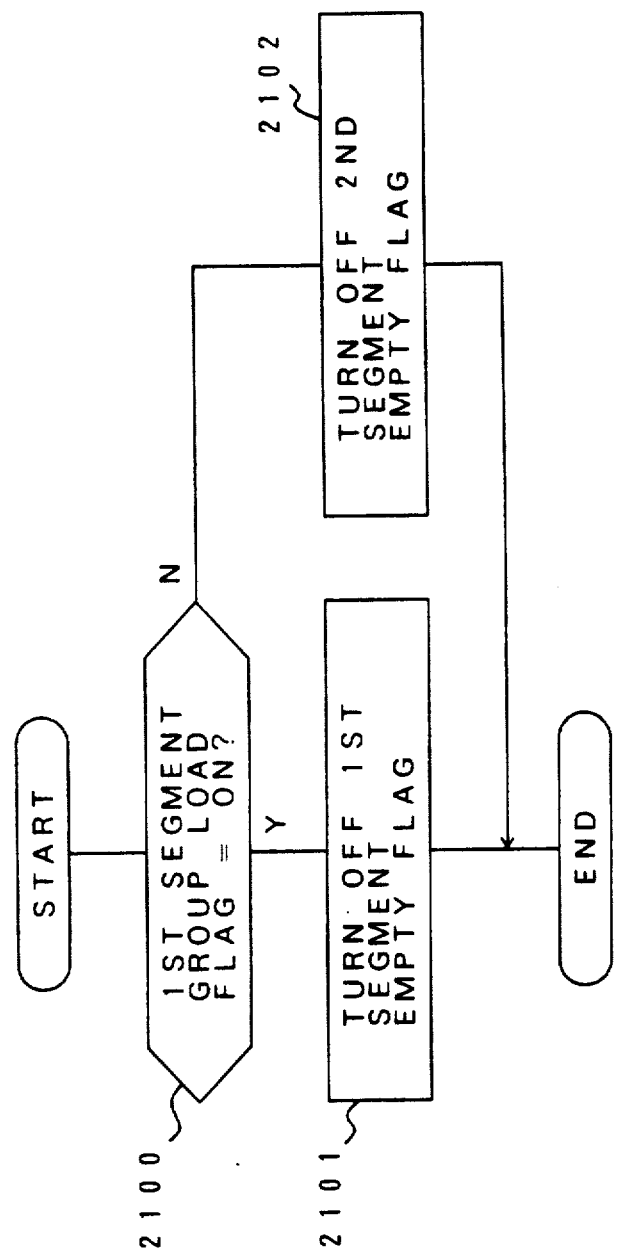
FIG. 21 is a flowchart indicative of the operation of the first processor 300 performed when a request flag is turned off in the first embodiment.

If the request flag 1400 is on, a wait is had until the request flag 1400 is turned off (step 2003). Thus, if the request flag 1400 is turned off, a shift is made to step 2004 where the processing shown in FIG. 21 is called.

It is then checked whether the first segment group load flag 903 in the slot managing information 800 pointed to by the read information 1113 is on (step 2005).

As a result, if so, a jump is made to step 2007. If not, the following processing is performed (step 2006). All the addresses of the segments 13 belonging to the first segment group 72 of FIGS. 8A and 8B are set in the load segments 1403 at step 2006.

It is then checked whether the initial load flag 907 is on (step 2016). As a result, if the flag is off, a jump is made to step 2019. If the flag is on, the cylinder No. 1105 and head No. 1106 are set on the load cylinder 1401 and the load track 1402, respectively (step 2017). The initial load flag 907 is then turned off (step 2018) and a jump is then made to step 2020.

If the initial load flag 907 is off at step 2016, a track 400 indicated by the segment cylinder/track 902 corresponding to the last segment of the second segment group 75 is obtained. The number of the cylinder 500 and the number of the read/write head 305 corresponding to the track next to the obtained track 400 are calculated. Thereafter, the results of the calculation are stored in the corresponding load cylinder 1401 and the load track 1402 (step 2019).

At step 2020, a track 400 is obtained corresponding to the numbers of the cylinder 500 and of the read/write head 305 stored in the load cylinder 1401 and load track 1402. The numbers of the cylinders 500 and of the read/write heads 305 to which n consecutive tracks 400 starting with that track belong are calculated based on that track 400. Thereafter, the calculated values are stored in the n segment cylinders/tracks 902 corresponding to the segments 13 of the first segment group 72. Furthermore, the first segment group load flag 906 is turned on and a jump is then made to step 2008.

If the first segment group load flag is on at step 2005, a shift is made to step 2007 where all the addresses of the segments 13 belonging to the second segment group 75 are set in the load segments 1403. The track 400 indicated by the segment cylinder/track 902 corresponding to the last segment of the first segment group 75 is obtained. Thereafter, the numbers of the cylinder 500, and the read/write head 305 corresponding to the track next to the obtained track are stored in the load cylinder 1401 and load track 1402, respectively. The following processing will be performed by using as a reference the track 400 corresponding to the numbers of the cylinder 500 and of the read/write head 305 stored in the load cylinder 1401 and load track 1402. The numbers of the cylinders 500 and of the read/write heads 305 to which the n consecutive tracks 400 belong, starting with the track 400 as the reference, are set in the n segment cylinders/tracks 902 corresponding to the segments in the second segment group 75. Thereafter, the first segment group load flag 903 is turned off.

The request flag 1400 is turned on in order to cause the second processor 301 to perform a loading operation for one rotation (step 2008).

It is then checked whether the number of transfer completion records 1109 is equal to the number of records to be transferred (step 2009).

As a result, if equal, a jump is made to step 2011. If not, it is checked whether the first and second segment group empty flags 903 and 904 are both off (step 2010).

If both the flags are off, a jump is made to step 2014. If one of the flags is on, await is had until the request flag 1400 is turned off (step 2011).

If the request flag 1400 is turned off, the processing shown in FIG. 21 is called (step 2012) and then a jump is made to step 2005.

If the number of records to be transferred 1108 is equal to the number of transfer completion records 1109 at step 2009, it is checked whether both of the first and second empty flags 903 and 904 are off (step 2013).

As a result, if both the flags are off, transfer is terminated. If not, a return is made to step 2000.

Figure 22:
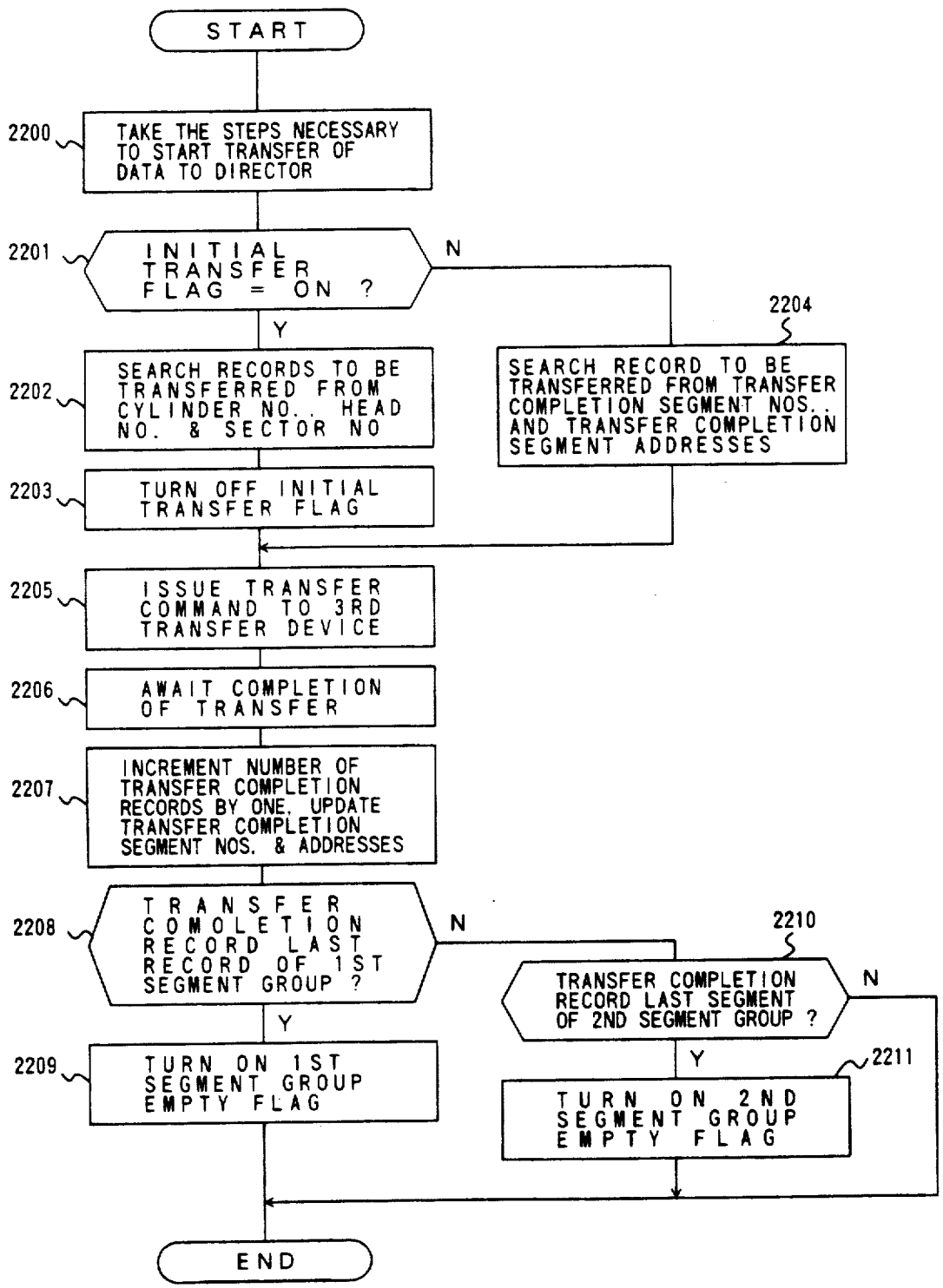
FIG. 22 is a flowchart indicative of data transfer between a third transfer device 315 and a director 25 of the first embodiment.

At step 2014, the processing shown in FIG. 22 is called in order to transfer a single record from/to the director 25.

Thereafter, it is checked whether the sequential flag 1104 is off and whether the number of records to be transferred 1108 is equal to the number of transfer completion records 1109 (step 2015).

As a result, if these conditions do not hold, a jump is made to step 2000. If the conditions hold, the processing is ended.

The details of the steps 2004 and 2012 of FIG. 20A will be described with reference to FIG. 21, which is a flowchart of the operation of the processor 300 performed when the request flag is turned off in the first embodiment. In the present embodiment, it is first checked whether the first segment group load flag 905 of FIG. 9 is on (step 2100).

As a result, if on, the first segment group empty flag 903 is turned on and the processing is ended (step 2101). If off, the second segment group empty flag 904 is turned off and the processing is ended (step 2102).

The details of the step 2014 of FIG. 20B will be described with reference to FIG. 22, which is a flowchart indicative of the transfer operation between a third transfer device 315 and the director 25 in the first embodiment.

In the present embodiment, a request for connection for starting the transfer of data from/to the director 25 shown in FIG. 5 is made through the director interface 303 (step 2200).

If the transfer from/to the director 25 becomes possible, it is checked whether the initial transfer flag 907 of FIG. 11 is on (step 2201). If off, a jump is made to step 2204.

If on, a segment 13 to be transferred is searched using the cylinder No. 1105 and the head No. 1106 and the segment cylinder/track 902 shown in FIG. 13, and the segment 13 is searched in accordance with an address determined by the sector No. 1107 to find a record 401 to be transferred (step 2202).

Thereafter, the initial transfer flag 907 is turned off (step 2203) and a jump is made to step 2205.

At step 2204, a record 401 to be transferred is sought using the transfer completion segment No. 1111 and the transfer completion segment address 1112. Thereafter, the third transfer device 313 is instructed to transfer data for one record (step 2205) and the completion of this transfer is awaited (step 2206).

If a notice of the completion is received, the number of transfer completion records 1109 is incremented by one and the transfer completion segment No. 1111 and the transfer completion segment address No. 1112 are updated in accordance with the transfer completion record 401 (step 2207).

It is then checked whether the transfer completion record is the first segment group last record 76 of FIGS. 8A and 8B (step 2208).

As a result, if so, the first segment empty flag 903 is turned on and the processing is ended (step 2209).

If not, it is checked whether the transfer completion record is the second segment group last record 77 (step 2210).

As a result, if so, the second segment empty flag 904 is turned on and the processing is ended (step 2211).

Figure 23:
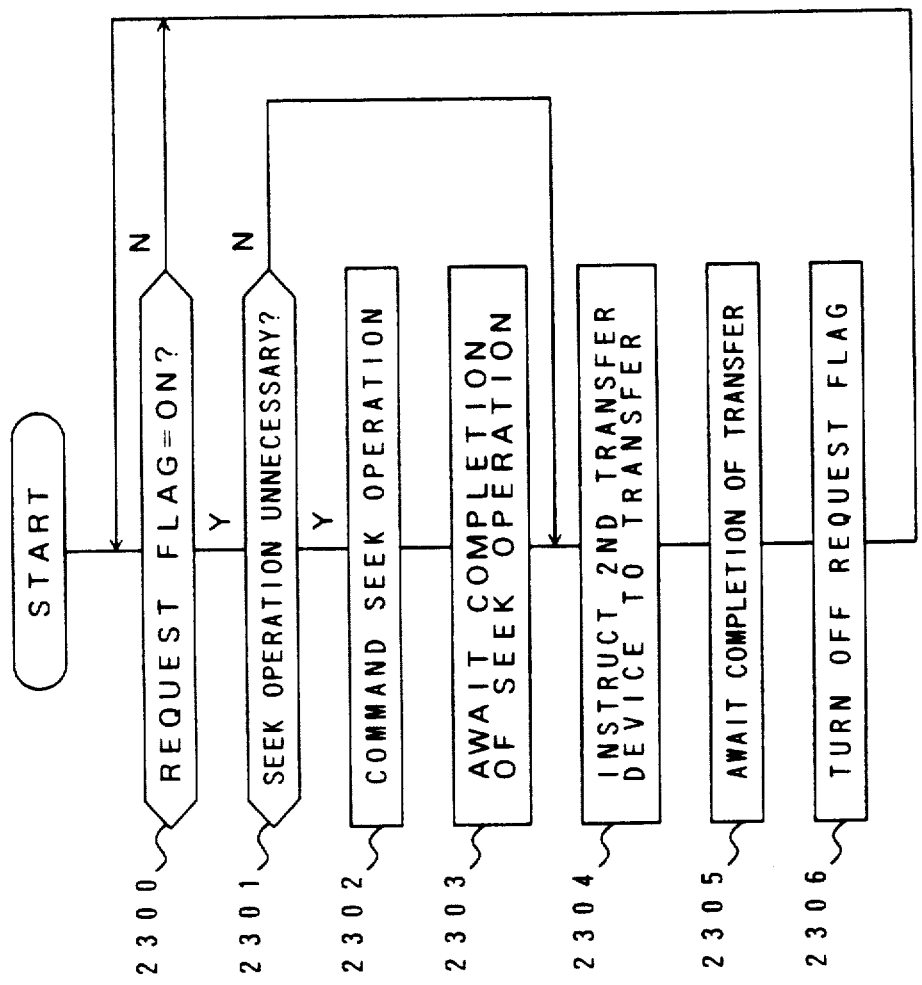
FIG. 23 is a flowchart indicative of the loading operation of a second processor 301 for one complete rotation in accordance with a command from the first processor 300.

The loading operation of the second processor 301 for one rotation in accordance with the commands from the first processor 300 of FIG. 5 in the first embodiment will be described with reference to a flowchart of FIG. 23.

In the present embodiment, await is had until the request flag 1400 is turned on (step 2300), in which case the processing at step 2301 and the subsequent steps will be performed. The number of the cylinder 500 below the current read/write head 305 will be obtained through the load cylinder 1401 and read/write head interface 306. It is checked from its value whether a seek operation is required (step 2301).

As a result, if not, a jump is made to step 2304.

If the seek operation is required, a seek request is made through the read/write interface 306 (step 2302). Thereafter, the completion of the seek operation is awaited (2303).

If the seek operation is completed, the n second transfer devices 312 are instructed to transfer data (step 2304). In this case, the second processor 301 sets in the second transfer device interface 313 and the second switch 314 information on the second transfer devices 312 used, the tracks selected and the segments in which information on the track are loaded by the second transfer devices.

Further, the completion of transfer by the n second transfer devices 313 is awaited (step 2305).

If the transfer of the n second transfer devices is completed, the request flag 1400 of FIG. 16 is turned off (step 2306) and a jump is made to step 2300.

The following are realized by the first embodiment:
(1) Appropriate buffers are allocated to sequential and random transfer requests;
(2) The data read in compliance with the sequential transfer request is protected against destruction due to a random transfer request;
(3) A process is provided for allocating buffers competing for the respective sequential transfer processes;
(4) For a random transfer request for many records, records are loaded temporarily on the buffer 307 and then transferred to the controller 23, so that the data transfer speed between the disk unit 24 and the controller 23 can be increased.

Second Embodiment

In the present embodiment, the operation of the system performed when data on the number of records to be transferred is not received beforehand from the director 25 of FIG. 5 will be described. The computer system and the buffered disk units 24 of the present embodiment are similar to those of the first embodiment. The second embodiment is the same as the first embodiment except for the points referred to below.

Usually, the time passing from the completion of transfer of a plurality of records 401 to the reception of a request for transfer of the next records 401 is very short, for example, on the order of scores of microseconds. Therefore, in the present embodiment, if no transfer request is received within a predetermined time after the completion of transfer of a record 401, the input/output process is regarded as being completed. Since there are many cases where the number of records 401 to be transferred is 1 (unity) in the non-sequential transfer, data is loaded on the buffer 307 only when no director 25 is secured.

The entire information in the second embodiment will be described with reference to FIG. 24. In the embodiment, a transfer completion recognition flag 1600 is provided instead of the number of records to be transferred 1108 and the number of transfer completion records 1109 of the first embodiment shown in FIG. 13. This flag is turned on when it is recognized that all the proper records 401 are sent to the director 25 in compliance with the received input/output request.

In the present embodiment, the processing of the first processor 300 performed when the first processor 300 of FIG. 5 has received an input/output request and the reading operation of the first processor 300 using the buffer 307 will be described.

Figure 25:
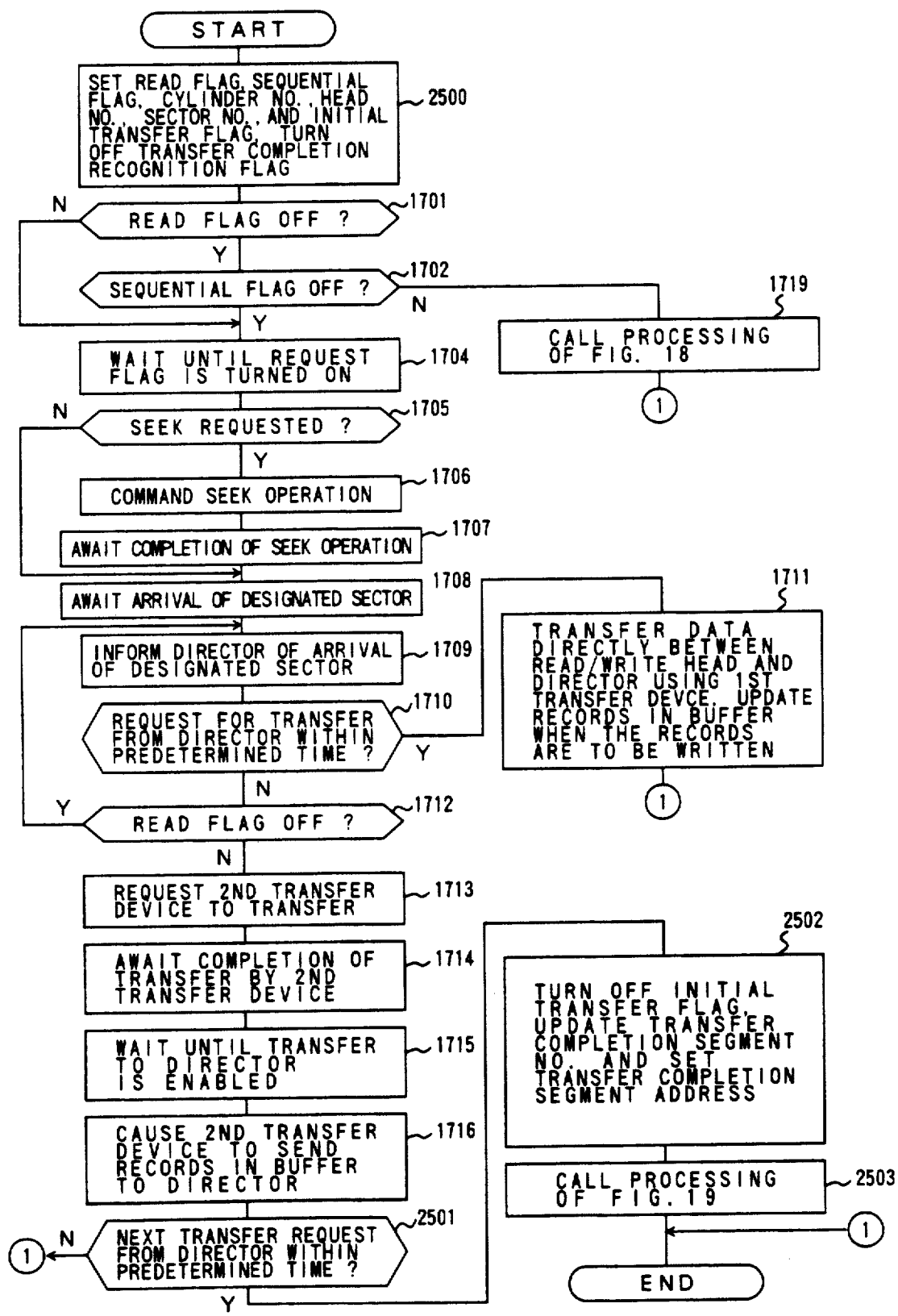
FIG. 25 is a flowchart indicative of the operation of the first processor 300 performed when the processor 300 receives an input/output request in the second embodiment.

FIG. 25 is a flowchart indicative of the operation of the first processor 300 performed when this processor has received an input/output request in the second embodiment.

In the present embodiment, step 2500 corresponds to step 1700 of FIG. 17. This is the initial setting of the respective pieces of information performed when an input/output request from the director 25 is received. The transfer completion recognition flag 1600 is turned off instead of setting a value in the number of records to be transferred 1108 (FIG. 13) and clearing the number of transfer completion records to 0 at step 1700.

In FIG. 25, there is no processing corresponding to step 1703 of FIG. 17, and step 1704 is started in the case of random reading.

At step 1716, the processing performed after the record 401 read into the buffer 308 is transferred to the director 25 differs from that in the first embodiment. In the present second embodiment, after the record 401 is transferred, a request for reading the next record 401 from the director 25 is awaited for a predetermined time since the record 401 was transferred (step 2501). If no reading request is received, the processing is ended. If the read request is received, the initial transfer flag 1113 is turned off (step 2502). Thereafter, the processing of FIG. 19 is called in order to execute the transfer of the next record (step 2503).

Figure 26A:
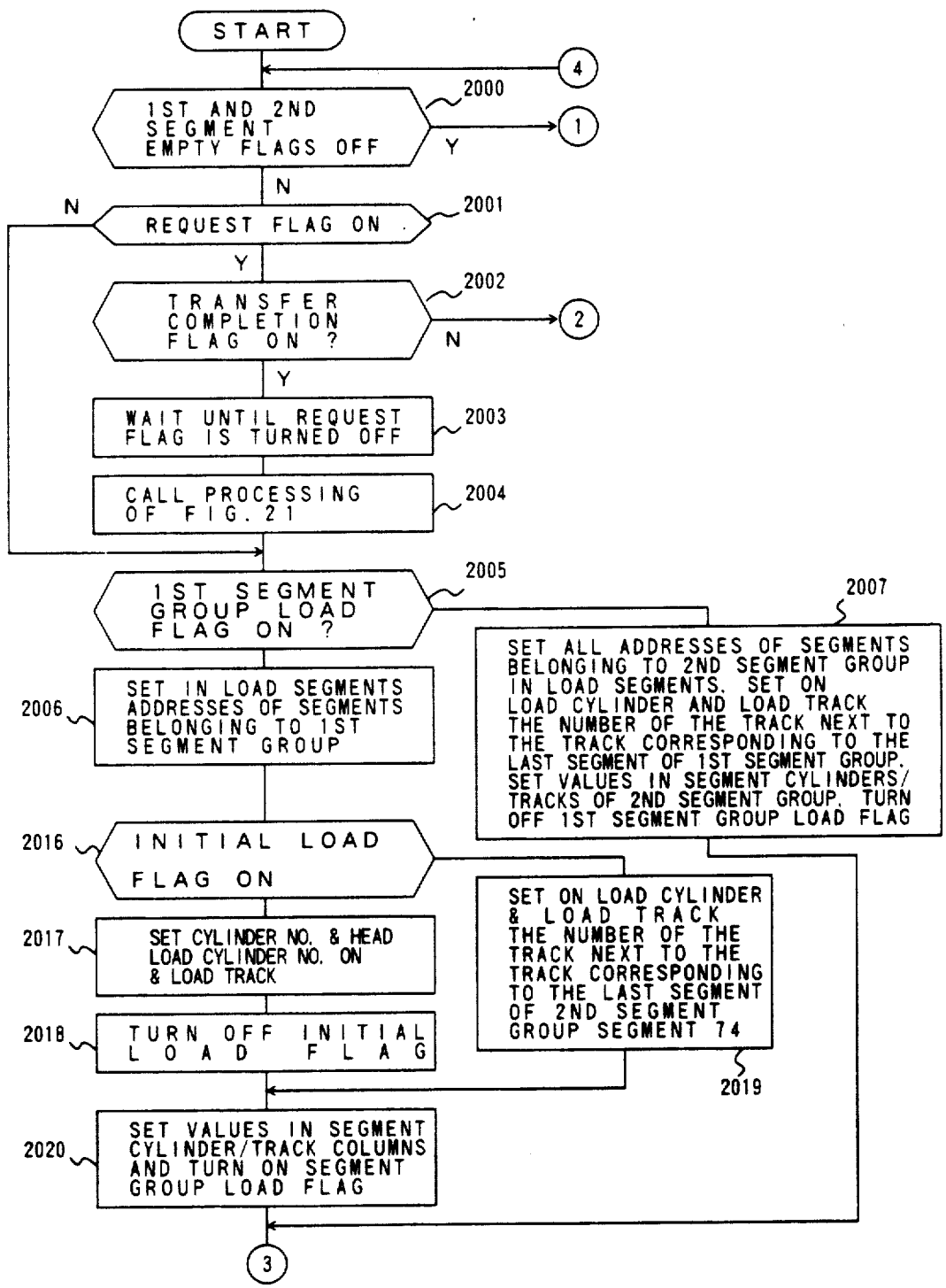
FIGS. 26A and 26B are flowcharts indicating the reading operation of the first processor 300 using a buffer 307 in the second embodiment.
Figure 26B:
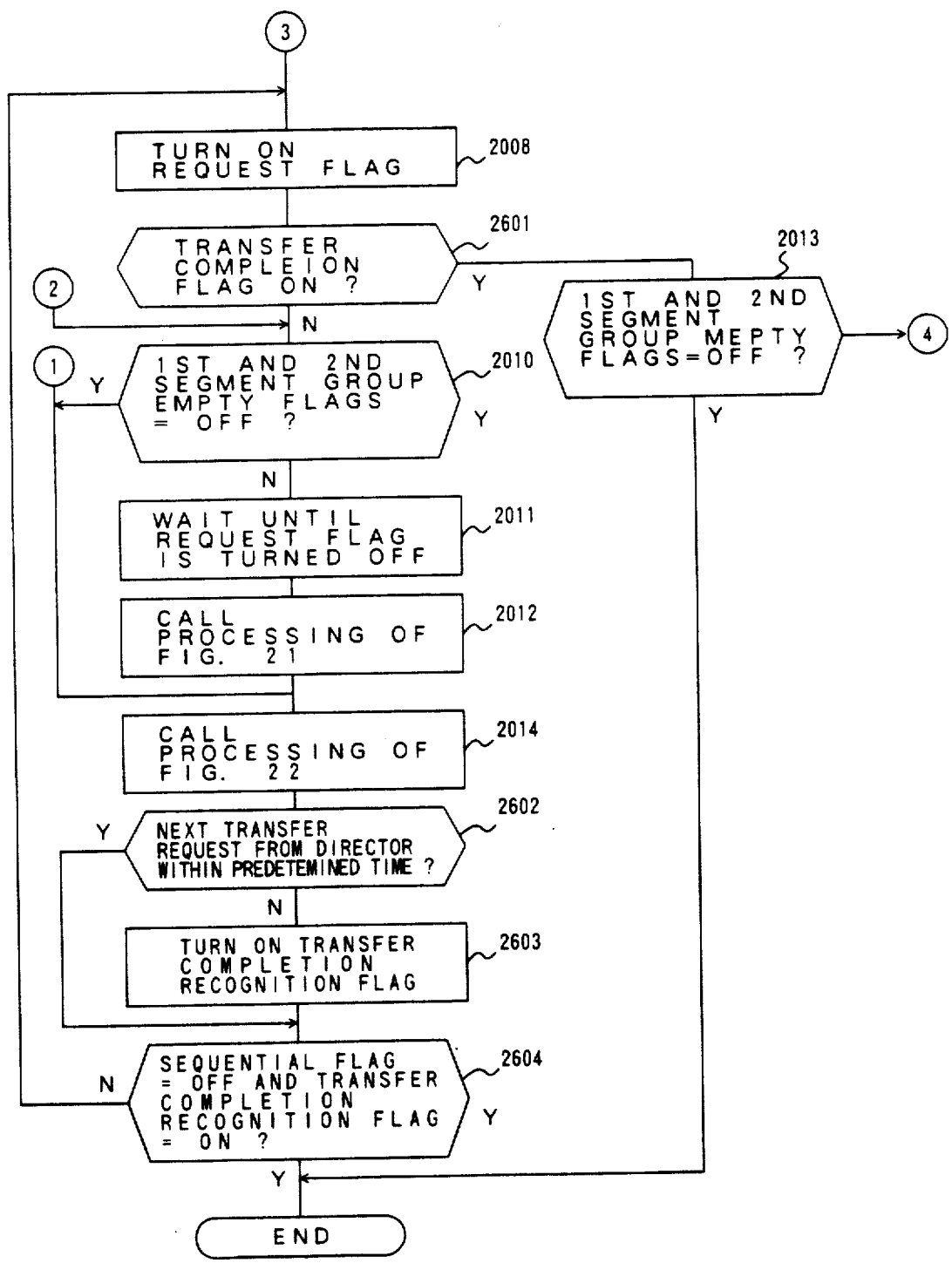

FIGS. 26A and 26B are a flowchart indicative of the reading operation of the first processor 300 using the buffer 307 in the second embodiment.

FIGS. 26A and 26B correspond to FIGS. 20A and 20B (first embodiment). Therefore, in the present embodiment, the processing flowchart which is called at step 1806 of FIG. 18 and at step 1902 of FIG. 19 is the one of FIGS. 26A and 26B.

In step 2600 shown in FIG. 26A, it is noted that the description in relation with step 2010 in FIG. 26B is omitted since the process is obvious.

Figure 24:
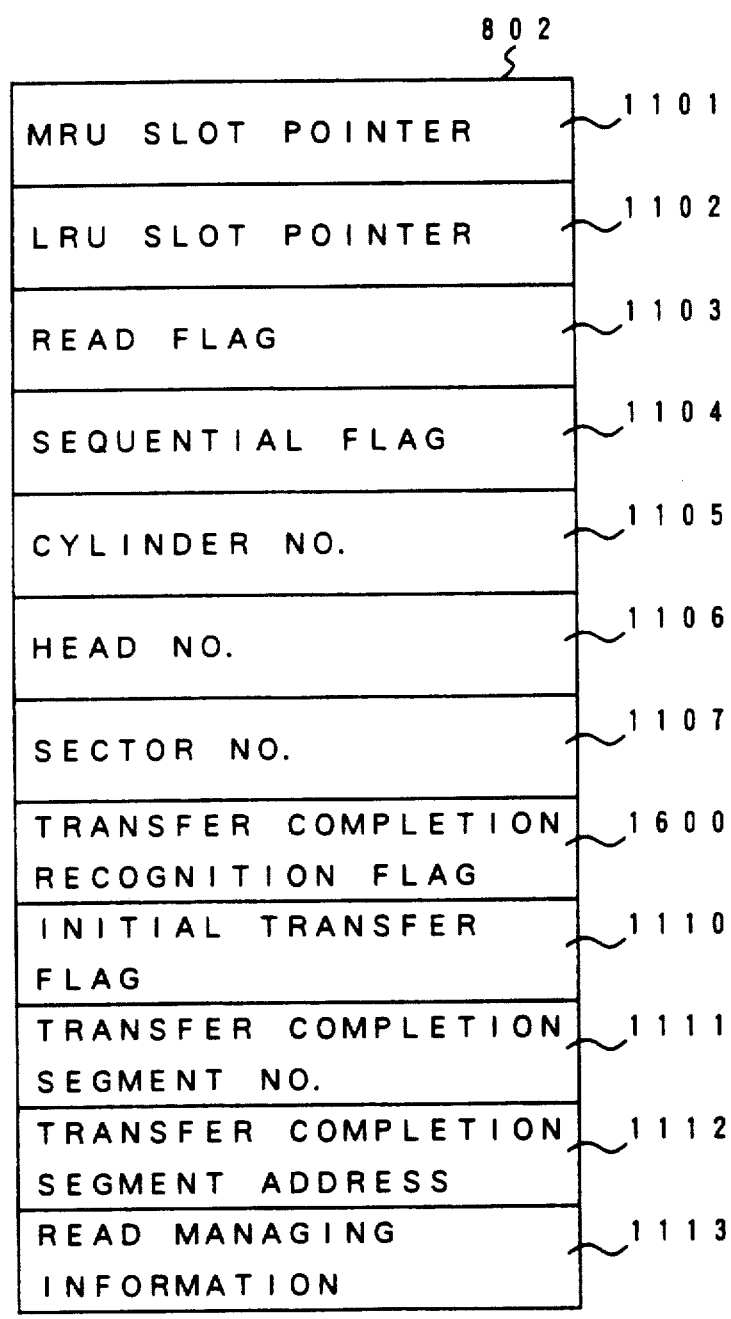
FIG. 24 illustrates the entire information in a second embodiment of the present invention.

In the present embodiment, it is checked at step 2601 whether the transfer completion recognition flag 1600 of FIG. 24 is on.

The termination of the input/output process is recognized with the transfer completion recognition flag 1600 in the present embodiment. In the first embodiment, the completion of the input/output process is recognized with the coincidence of the number of records to be transferred 1108 and the number of transfer completion records 1109.

In the present embodiment, after the process of FIG. 22 is called at step 2014, the arrival of a request for transfer of the next record 401 is awaited for a predetermined time (step 2602). If the next request for transfer arrives from the director 25, a jump is made to step 2013. If not, the transfer completion recognition flag 1600 is turned on (step 2603). It is checked whether the sequential flag is off and whether the transfer completion recognition flag 1600 is on (step 2604). If these two conditions are met, the processing is ended.

The difference between the second embodiment and the first embodiment already described is as follows. In the first embodiment, the controller 23 beforehand informs the disk unit of the number of records to be transferred. In contrast, in the second embodiment, for a random read request, data is loaded on the buffers 307 only when no transfer paths are secured between the disk units 24 and the controller 23 after the completion of the locating process.

Third Embodiment

In the present embodiment, the structure of the slots 12 of FIG. 7 (first embodiment) and a process of allocating the slots 12 are changed as follows.

(1) A change of the random processing buffer;

In the present embodiment, the random processing buffer 10 of FIG. 6A is composed of a plurality of allocation units.

Thus, when a read request for the data stored in the allocation units occurs, the data in the allocation units is only read.

The non-sequential reading does not almost cover a plurality of tracks 400, so that the allocation units are provided in correspondence to the tracks 400.

The respective allocation units are managed in the order of time of access. Thus, if a read request for a track 400 to which no allocation unit is allocated is received, the allocation unit which has not been accessed for the longest interval of time is selected.

(2) A change of the sequential processing buffer;

In the present embodiment, the sequential processing buffer 11 of FIG. 6B is composed of the plurality of slots 12. Only the slots 12 which have not been accessed over a predetermined time are handled as being allocated to the sequential reading process. Because if the sequential reading process to which no slots 12 are allocated is received when only a few slots 12 are managed in the LRU order, the previously read data may be lost. The method of managing slots 12 in the LRU order is effective when the frequencies of accesses in the respective sequential reading processes corresponding to the respective slot 12 vary or the buffer 307 consists of relatively many slots 12.

Therefore, in the present embodiment, unless there are slots 12 which have not been accessed over a predetermined time when a new sequential read request is accepted, no slots 12 are allocated to the newly accepted sequential reading request and data is transferred directly from the read head 305.

The specified structure of the present embodiment will be described. FIG. 27 illustrates the random processing buffer 10 of the third embodiment in which there are a plurality of random slots 2700. Data on a single track 400 is stored in each random slot 2700.

Figure 28:
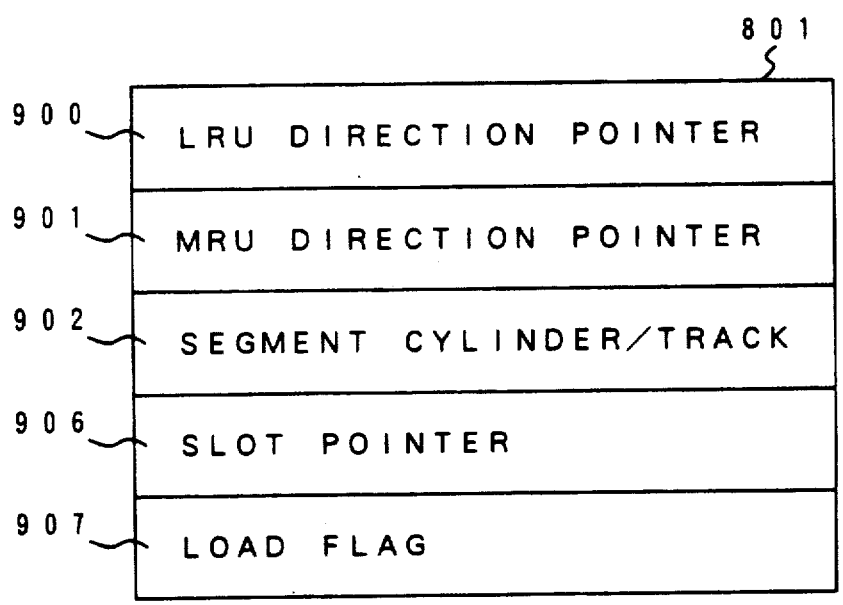
FIG. 28 illustrates the random slot managing information 801 in the third embodiment.

FIG. 28 illustrates the random slot managing information 801 in the third embodiment in which there are a plurality of pieces of random slot managing information 801 corresponding to the random slots 2700 of FIG. 27 and stored in the buffer managing information 308 of FIG. 5.

An LRU direction pointer 900 points to random slot managing information 801 which has not been read for the next longest time, to the present random slot managing information 801. An MRU direction pointer 901 points to the random slot managing information 801 which has not been read for the next shortest time to the present random slot managing information 801.

Especially, in the present embodiment, pieces of the random slot managing information 801 are managed in order of time of access, so that values are set also in the LRU and MRU direction pointers 900 and 901 unlike the first embodiment of FIG. 12. In the first embodiment, the MRU and LRU direction pointers 901 and 900 in the random slot managing information 801 were in a null state.

Since the random slot 2700 stores the record on a single track, the number of segments/cylinders 902 used is 1 (unity). For similar reasons, flags such as the first and second segment group empty flags 903 and 904 and the first segment group load flag 905 are not required.

Figure 29:
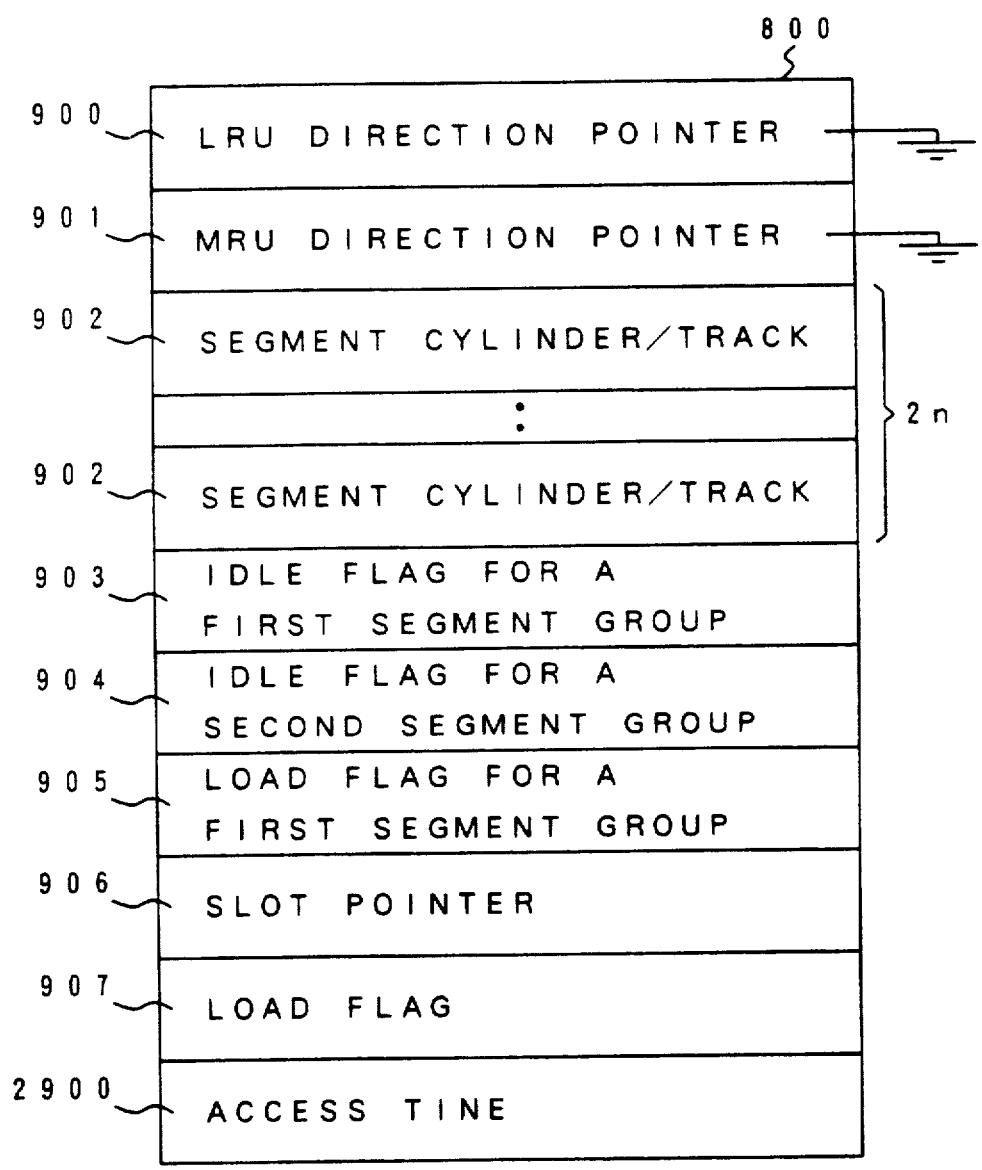
FIG. 29 illustrates the sequential slot managing information 800 in the third embodiment.

FIG. 29 illustrates the sequential slot managing information 800 in the third embodiment of the present invention. In FIG. 29, reference numeral 2900 denotes the access time when the appropriate sequential slot managing information 800 is read.

In the present embodiment, the pieces of sequential slot managing information 800 are not managed in the LRU queue. Therefore, the LRU and MRU direction pointers 900 and 901 are different from those of the first embodiment of FIG. 11 and are nullified.

Figure 30:
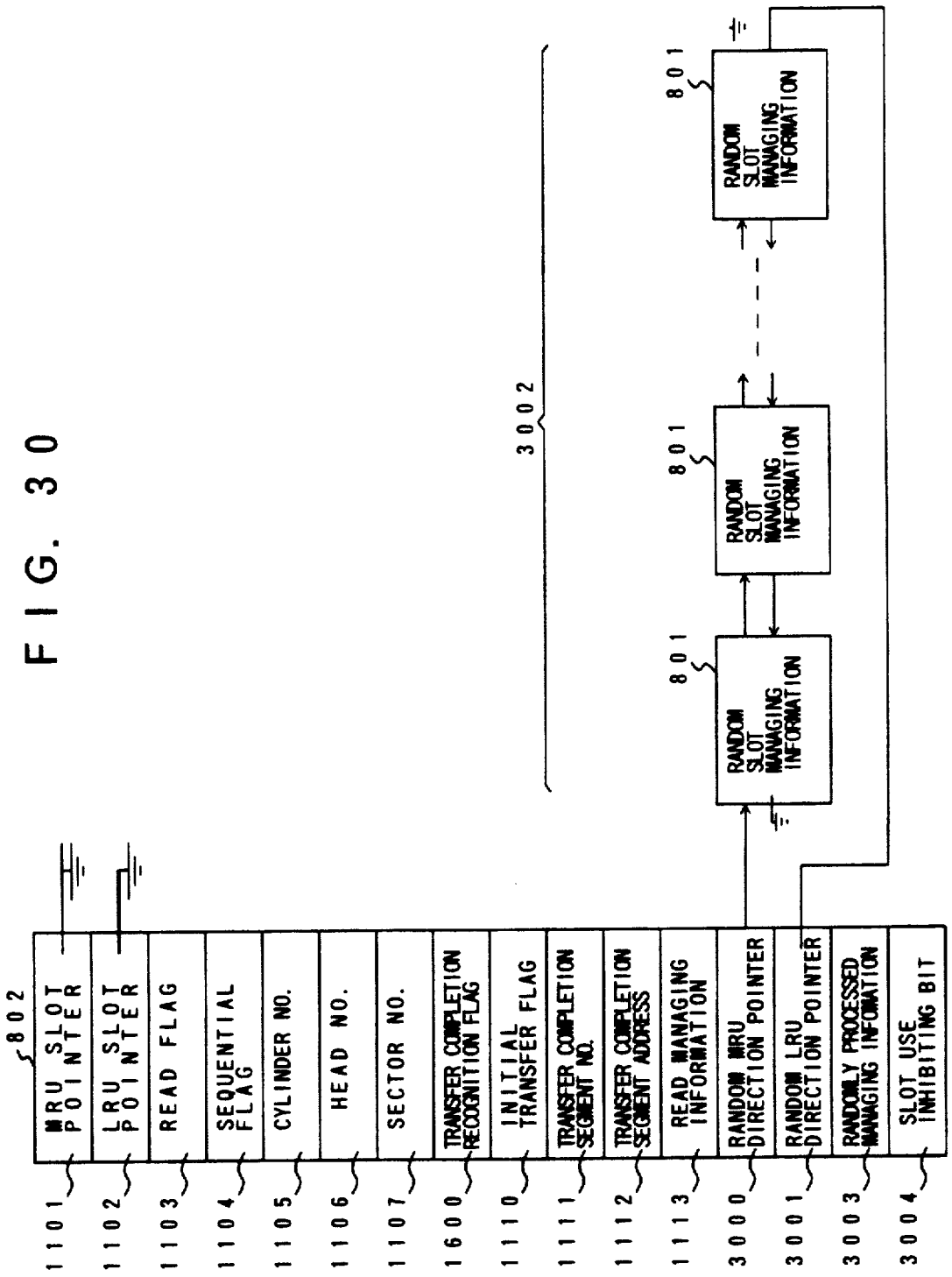
FIG. 30 illustrates the structure of the entire information and a random LRU queue 1100 in the third embodiment.

FIG. 30 illustrates the structure of the entire information and the structure of a random LRU queue 1100 in the third embodiment. The operation of the present embodiment performed when the direction 25 of FIG. 5 does not designate the number of records to be transferred and handled in the input/output process will be described.

In FIG. 30, reference numeral 3000 denotes a random MRU direction pointer which points to the random slot managing information 801 which has been read most recently; 3001, a random LRU direction pointer which points to the random slot managing information 801 which has not been read for the longest interval of time; 3002, a random LRU queue; 3003, a randomly processed managing information which is a pointer to the random slot managing information 801 which is to be read; and 3004, a slot use inhibiting bit which is set when the buffer 307 is not used in the reading process.

Since the pieces of sequential slot managing information 800 in the present embodiment are not managed in the LRU order, the MRU and LRU pointers 1111 and 1112 are nullified.

Since the pieces of random slot managing information 801 are required to be managed in order of access, the random MRU pointer 3000 and the random LRU pointer 3001 are provided to manage the pieces of random slot managing information 801 in the random LRU queue 3002 and the operation is similar to that of the LRU queue 1100 in the first embodiment of FIGS. 14A and 14B and FIGS. 15A and 15B.

Since in the above embodiment, the number of pieces of random slot managing information 801 is 1 (unity), no randomly processed managing information 3003 is required to be provided.

In the present embodiment, in order to store a time when the sequential reading process is received, a clock (not shown) is provided in the first processor 300. Thus, when a particular instruction is carried out, the current time is available through that clock.

The procedures of processing in the present embodiment will be described below. The present embodiment has the following features when the non-sequential reading process is performed:

(1) The record on a single track 400 is stored in a random slot 2700 of FIG. 27. If a transfer path to the director 25 of FIG. 5 cannot be secured after sector setting, all the records 401 on the track 400 are loaded in the random slot 2700 and are then started to be transferred to the director 25; and (2) If the reading process is not completed only with transfer of data on the track 400 which was first accessed, no buffer 307 is used any longer and data is transferred directly between the read/write head 305 and director 25.

FIGS. 31A, 31B, 31C and 31D are flowcharts indicative of the operations of the first processor 300 performed when it has received an input/output request from the director 25 in the third embodiment. FIG. 32 is a flowchart indicative of the operation of the first processor 300 when it receives non-sequential reading request in the third embodiment. FIG. 33 is a flowchart indicative of an operation performed when there is a slot allocated to sequential reading in the third embodiment.

Figure 31A:
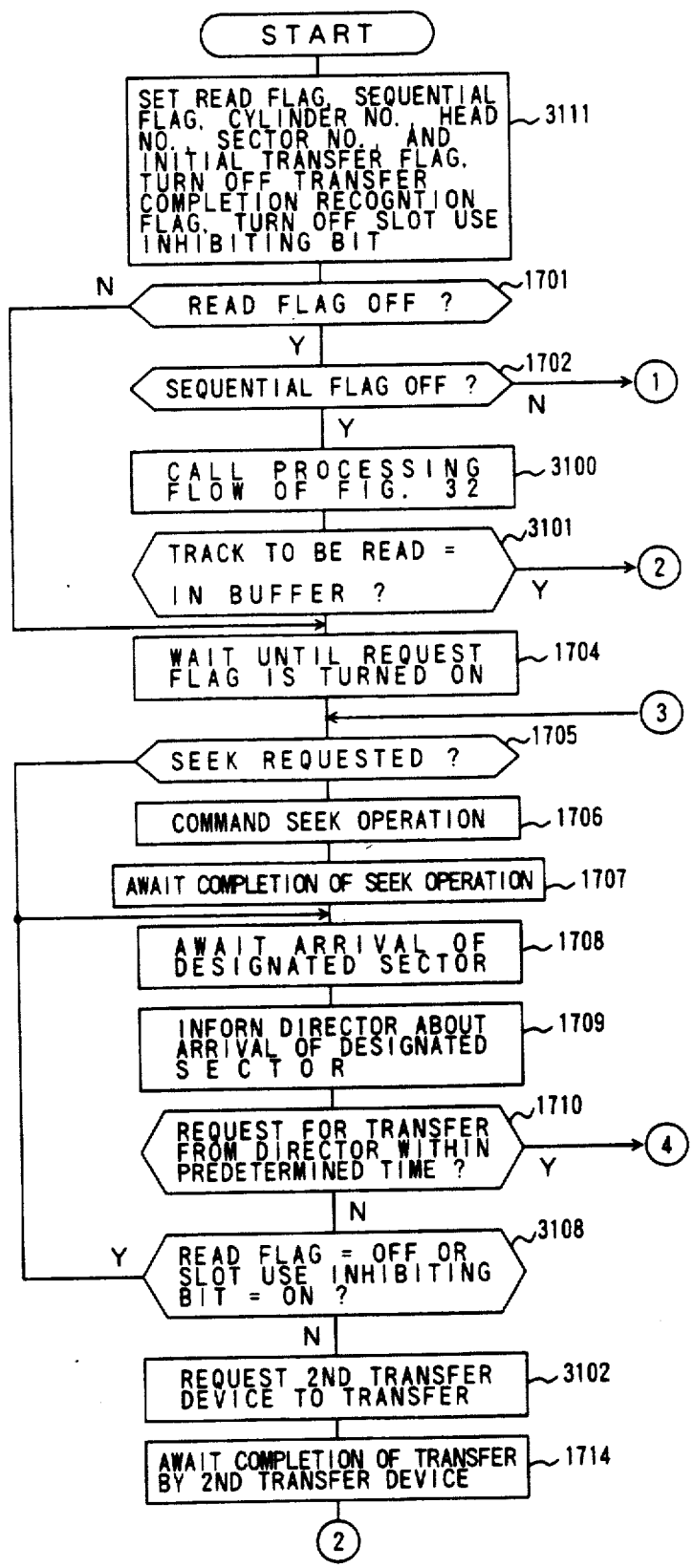

In FIG. 31A, step 3111 corresponds to the step 2500 of FIG. 25 and is for setting initial information. In the present embodiment, a slot use inhibiting bit 3004 is turned off, unlike the previous embodiment.

The processing of FIG. 32 is called if the sequential flag 1104 of FIG. 30 is off or a non-sequential reading request is received at step 1702 in the present embodiment (step 3100).

Thus, after the processing of FIG. 32 is completed, it is checked whether the track 400 to be read is present in the buffer 307 (step 3101). As a result, if present, a jump is made to step 1715 to send data in the buffer 307 to the director 25. If not, the processing at step 1704 and the subsequent steps start.

At the step 3102 corresponding to step 1713 of FIG. 25, the second transfer devices 312 handle the random slots 2700, selected in the processing flow of FIG. 32, as been transferred. Similarly, at step 3103 corresponding to step 1716, the third transfer device 314 also handles the random slots 2700, selected in the processing flow of FIG. 32, as been transferred because there are a plurality of such random slots 2700. The random processing buffer 10 is composed of a single slot 12 at steps 1713 and 1716 of FIG. 25, so that the slot 12 to be transferred is determined unconditionally.

When a request for sequential reading process is accepted, it is checked at step 3104 whether a slot is allocated to the accepted reading process.

As a result, if so, a jump is made to step 3106 to call the processing of FIG. 33.

If not allocated, the following process is executed. Slots 12 are sought which have not been read for a predetermined time in accordance with the current time and the access times 2900 in all pieces of sequential slot managing information 800 (step 3105). If there is at least one slot 12 which has not been read for the predetermined time, the processing of FIG. 33 is called (step 3106). If not, a slot use inhibiting bit 3004 is turned on (step 3107). Thereafter, a jump is made to step 1704.

If no director 25 is secured after sector setting is completed, and if the conditions that the read flag 1103 is off or the slot use inhibiting bit 3009 is on hold, a jump is made to step 1708 in the present embodiment because there is a case where the buffer 307 cannot be used even in the reading process (step 3108). In FIG. 25, a jump is made to step 1708 where one complete rotation of the disk 304 is awaited only when the read flag 1103 is off at step 1712.

The processing performed when non-sequential reading covers a plurality of tracks 400 will be described. This is the processing performed when the director 25 requests transfer of the next record 401 at step 2501 of FIG. 25.

In the present embodiment, it is checked whether the record of 401 next to the record the transfer of which is completed at step 3109 is present on the same track 400.

As a result, if so, a jump is made to step 1715 to start the next transfer.

If not, the following processing is performed at step 3110. The cylinder number and the read/write head number of a track 400 next to the track 400 which has been read are set in the cylinder No. 1105 and head No. 1106. Zero is then set in the sector No. 1107. Lastly, the slot use inhibiting bit 3004 is turned on. After the above processing, a jump is made to step 1705.

Lastly, the processing performed after the processing at step 1711 will be described. At step 1711, data is directly transferred between the read/write head 305 and the director 25. Therefore, data transfer can be completed without using the allocated random slot 2700. Therefore, there will occur the need for resetting the contents of the random slot managing information 801 of the allocated random slot 2700.

It is checked in the present embodiment whether the read flag 1103 is off or the sequential flag 1104 is off (step 3112). If this condition holds, the contents of the random slot managing information 801 pointed to by the randomly processed managing information 3003 are reset (step 3113). Therefore, the following operations are performed on the segment/cylinder tracks 902 in the random slot managing information 801 pointed to by the randomly processed managing information 3003. The numbers of the cylinders 500 which are not present on the plate 304 are set in the segment/cylinder tracks 902. Thus, no data is assumed to be present in the random slot 2700 corresponding to the random slot managing information 801. The random slot managing information 801 pointed to by the random MRU pointer 3000 is shifted to the position pointer by the random LRU pointer 3001. This operation corresponds to the restoration of the FIG. 15B state to the FIG. 15A state.

The details of the step 3100 of FIG. 31A will be described with reference to FIG. 32. This processing is performed by the first processor 300 of FIG. 5 when it receives a non-sequential reading process request.

As shown in FIG. 32, it is checked whether data on the track 400 to be read is stored in the random slot 2700 of FIG. 27 (step 3200).

As a result, if so, the corresponding random slot managing information 801 is shifted to the position pointed to by the random MRU pointer 3000 of FIG. 30 (step 3201) and a shift is made to step 3204. This operation is similar to that shown in FIGS. 14A and 14B.

If no track to be read is in the random slot 2700, the random slot managing information 801 pointed to by the random LRU pointer 3001 is shifted to the pointer indicated by the random MRU pointer 3000 (step 3202). This operation is similar to that shown in FIGS. 15A and 15B.

The values of the cylinder No. 1105 and head No. 1106 are initially set in the segment/cylinder tracks 902 of the random slot managing information 801 and shifted to the position pointed to by the random MRU pointer 3000 (step 3203).

The randomly processed managing information 3003 is then caused to point the random slot managing information 801 which the random MRU pointer 3000 points (step 3204).

Figure 31B:
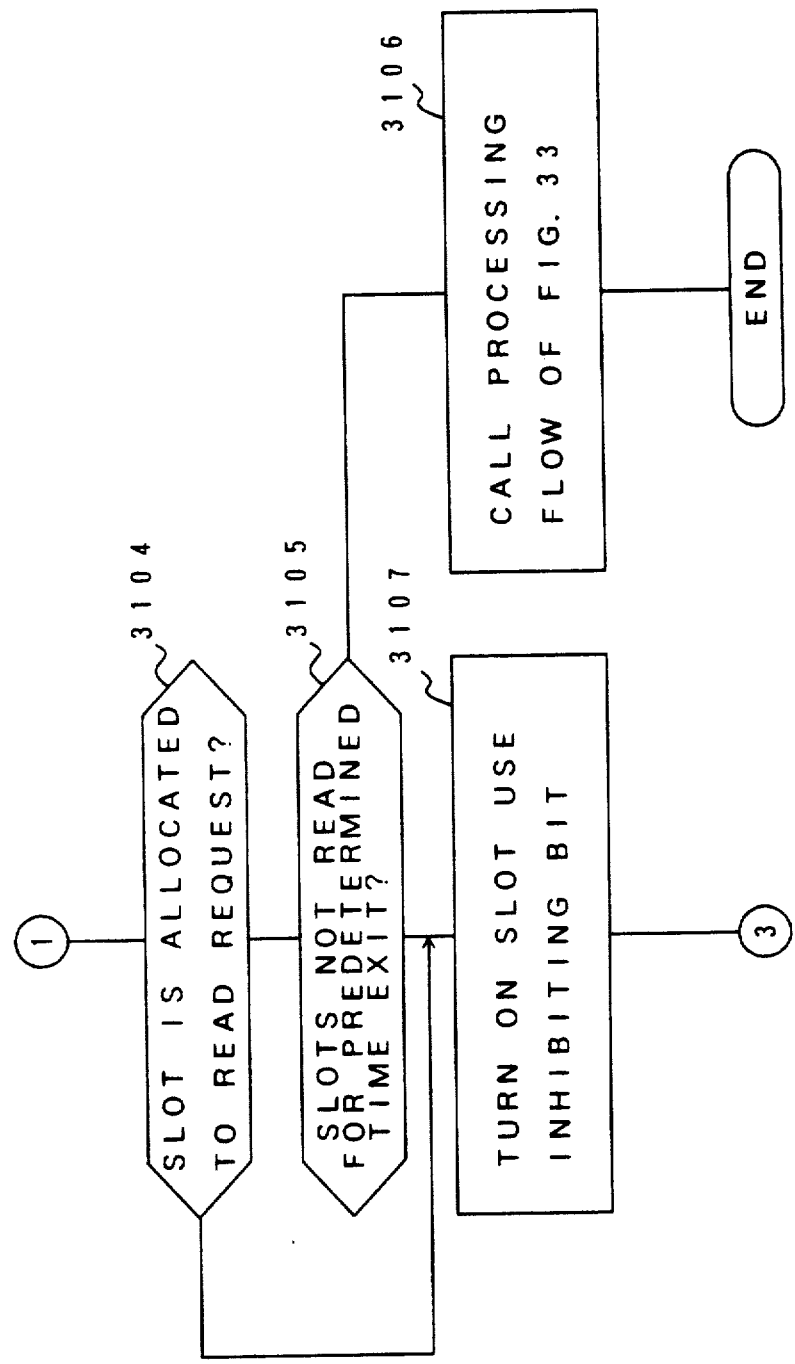
Figure 31D:
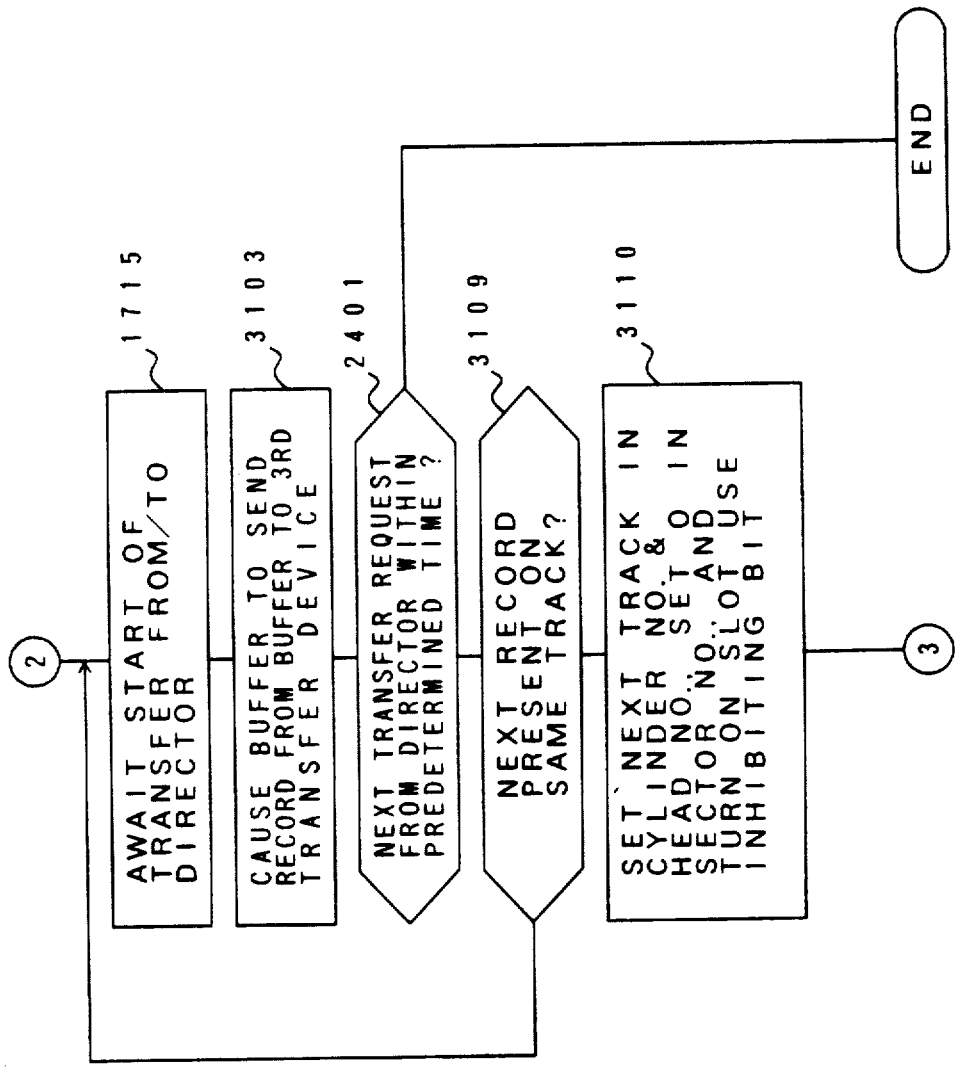

The details of the step 3106 of FIG. 31B will be described with reference to FIG. 33. This processing is performed when there is a slot allocated to a sequential reading process.

It is first checked whether a slot is already allocated to the accepted sequential reading process (step 3300).

As a result, if so, the sequential slot managing information 800 corresponding to that slot is read and set in the managing information to be set 1113 (step 3301).

If not allocated, step 3302 is executed. The piece of the sequential slot managing information 800 which has not been accessed for the longest time exceeding the access time 3004 is sought. Next, that piece of sequential slot managing information 800 is set in the read managing information 1113.

That sequential managing information 800 is initialized (step 303). The initialize process is the same as the process at step.

Lastly, the Processing of FIGS. 26A and 26B is called (step 3304).

As described above, several random slots 700 are allocated to a random transfer request in the third embodiment. Thus, if data to be read at the random transfer request is already in the buffer 307, the data can be read without performing a locating process. For a sequential transfer request, the time when the slots 13 have been accessed last is managed. If there is no slot 13 which has been accessed for more than a constant time before a sequential transfer request to which no slot 13 is allocated is accepted, no slot 13 is allocated. Thus, if the number of slots 13 is small, the previously read data is prevented from vanishing of the loaded data on the slots 13.

According to the present invention, high speed reading is achieved in a computer system having buffers in the disk units by realizing efficient buffer allocation between sequential reading process and random (non-sequential) reading process.

What is claimed is:

1. An input/output system comprising:
a controller connected to one or more disk units, said controller being connected through a channel to a processor, said one or more disk units each including a buffer, and each buffer including a first region having at least one buffer storage area for storing data for sequential data transfer and a second region having at least one buffer storage area for storing data for a non-sequential data transfer, said controller including means for effecting transfer of data between said one or more disk units and said processor by way of one of said first and second regions selected in accordance with whether a data input/output request issued by said processor is a request for sequential data transfer or a request for non-sequential data transfer.

2. An input/output system according to claim 1, wherein said second region of each buffer comprises a single buffer storage area.

3. An input/output system according to claim 1, wherein said first region of each buffer comprises a plurality of buffer storage areas.

4. An input/output system according to claim 1, wherein said first region of each buffer includes a plurality of buffer storage areas, and wherein each one of said plurality of buffer storage areas is arranged in an order corresponding to the time of most recent transfer of data to or from said buffer.

5. An input/output system according to claim 1, wherein when said controller sends a request to said one or more disk units for sequential data transfer in which said first region of said buffer has not been allocated, said one or more disk units allocates said buffer storage areas for said sequential data transfer which have not transferred data for the longest time.

6. An input/output system according to claim 1, wherein said first region for storing data for said sequential data transfer comprises a plurality of buffer storage areas, said disk units further including a means for storing a time corresponding to when said plurality of buffer storage areas have transferred data, and wherein when said one or more disk units receives a request for a sequential data transfer in which said buffer storage area for said sequential transfer has not been allocated, data is directly transferred between said one or more disk units and said controller unless a predetermined time interval has lapsed since the time when at least one buffer storage area of said first region for sequential data transfer previously transferred data.

7. An input/output system according to claim 1, wherein each buffer storage area in said first region and second region of said buffer has a capacity for accommodating a quantity of data to be transferred during at least two complete rotations of said disk unit.

8. An input/output system according to claim 1, wherein when no records for a sequential data transfer are loaded in said buffer storage areas allocated to said sequential data transfer when a request for said sequential data transfer is received from said controller, all the data on a track including records to be transferred are loaded into a buffer storage area of said first region for said sequential data transfer during one complete rotation of said disk unit, and wherein said loaded records are thereby transferred from said storage area to said controller.

9. An input/output system according to claim 1, wherein when a record for a sequential data transfer request is stored in said buffer storage areas allocated for sequential data transfer sand said disk unit receives a request for said sequential data transfer from said controller, said disk unit transfers said record stored in said buffer storage areas to said controller.

10. An input/output system according to claim 1, wherein when said request for said sequential data transfer is completed and said buffer storage areas allocated for said sequential data transfer thereby includes an empty region, said disk unit loads one or more records into said empty region.

11. An input/output system according to claim 1, wherein when a request for non-sequential data transfer is received and the location of a record to be transferred is then completed so that data transfer is then possible, data is directly transferred between said disk unit and said controller, wherein when the location of a record to be transferred is not completed and data transfer is impossible, said data to be transferred is loaded into buffer storage areas of said second region for non-sequential data transfer and transferred to said controller when the location of a record is completed and data transfer then becomes possible.

12. An input/output system according to claim 1, wherein when said processor sends a request for inputting data to or a request for outputting data from said controller, said processor informs said controller of a number of records to be transferred, and wherein said controller informs said disk unit of said number of records to be transferred.

13. An input/output system according to claim 1, wherein when said disk unit receives a request for said non-sequential data transfer of a single record and the location of a record to be transferred has been completed, said disk unit directly transfers data between said disk units and said controller, wherein when the location of a record to be transferred is not completed, said disk unit loads the record to be transferred in said buffer storage areas of said second region and then transfers said data to said controller when the location of a record is completed.

14. An input/output system according to claim 1, wherein said disk unit receives a request for a non-sequential data transfer of two or more records, said disk unit loads said records stored on a track into said buffer storage ares of said region for non-sequential data transfer, and thereby transfers said records to said controller.

15. An input/output system according to claim 1, wherein said second region for non-sequential data transfer includes a plurality of buffer storage areas.

16. An input/output system according to claim 15, wherein each one of said plurality of buffer storage areas is arranged in an order corresponding to the time when the most recent transfer of data to or from the buffer was executed.

17. An input/output system according to claim 15, wherein said plurality of buffer storage areas include a capacity for accommodating a quantity of data loaded on a single track on said disk unit.

18. An input/output system according to claim 15, wherein when said disk unit receives a request for a non-sequential data transfer and said data to be transferred is stored on a track in said buffer storage areas of said second region, said disk unit transfers said data stored in said buffer storage areas of said second region to said controller.

19. A data transfer method for use in a computer system in which a controller sends an input/output request from a processor to a disk unit through a buffer and performs data transfer between said processor and said disk unit through said buffer and a channel, said buffer including a first region having at least one buffer storage area and a second region having at least one buffer storage area, said method comprising the steps of:
informing said disk unit whether said input/output request is for a sequential data transfer when said controller informs said disk unit of said data input/output request from said processor; and
performing data transfer between said disk unit and said processor by using said first region of said buffer for sequential data transfer and said second region of said buffer for non-sequential data transfer.

20. A data transfer method according to claim 19, wherein said second region of said buffer comprises a single buffer.

21. A data transfer method according to claim 19, wherein said first region of said buffer comprises a plurality of buffer storage areas.

22. A data transfer method according to claim 19, wherein said first region of said buffer comprises a plurality of buffer storage areas which are managed in an order corresponding to the time of the most recent transfer of data.

23. A data transfer method according to claim 22, wherein respective buffer storage areas of said buffer having a capacity for accommodating a quantity of data transferred during at least two complete rotations of said disk unit.

24. A data transfer method according to claim 19, wherein when said disk unit receives a request for a sequential data transfer in which a buffer storage area has not been allocated, said disk unit allocates a buffer storage area which has least recently transferred data.

25. A data transfer method according to claim 19, wherein when said controller sends a request to a disk unit for a sequential data transfer in which a buffer storage area has not been allocated, the data is directly transferred between said disk unit and said controller unless a predetermined time interval has lapsed since a plurality of buffer storage areas of said first region for sequential data transfer have most recently transferred data.

26. A data transfer method according to claim 19, wherein when a disk unit receives a request for sequential transfer and no records to be transferred for said sequential data transfer are loaded in a buffer storage area of said first region, all the data on a track including records to be transferred are loaded in said buffer storage area of said first region for sequential data transfer during one complete rotation of said disk unit, wherein said records are thereby transferred to said controller.

27. A data transfer method according to claim 19, wherein when a disk unit receives a request for sequential data transfer and a record to be transferred for said sequential data transfer is stored in a buffer storage area of said first region, said disk unit transfers the record in said buffer storage area of said first region to said controller.

28. A data transfer method according to claim 19, wherein when a disk unit completes a request for sequential data transfer and a buffer storage area of said first region for said sequential data transfer includes an empty region, said disk unit loads one or more records into said empty region.

29. A data transfer method according to claim 19, wherein when a disk unit receives a request for non-sequential data transfer and the location of a record to be transferred is then completed so that data transfer becomes possible, data is directly transferred between said disk unit and said controller, wherein when a request for data transfer is impossible, the record to be transferred is loaded into said second region for said non-sequential data transfer and transferred to said controller when data transfer becomes possible.

30. A data transfer method according to claim 29, wherein when a disk unit receives a request for a non-sequential data transfer of two or more records, said disk unit loads all the records onto a track in a buffer storage area of said second region for said non-sequential data transfer, and then transfers said records to said controller.

31. A data transfer method according to claim 19, wherein when said processor sends a request for inputting data to or outputting data from said controller, said processor informs said controller of a number of records to be transferred, and wherein said controller informs disk unit of said number of records to be transferred.

32. A data transfer method according to claim 19, wherein when a disk unit receives a request for non-sequential data transfer of a single record and the location of a record to be transferred has been completed, said disk unit directly transfers data between said disk unit and said controller if the data transfer is possible, wherein said disk unit loads the record to be transferred in a buffer storage area of said second region for non-sequential data transfer if the data transfer is impossible, and then transfers said data to said controller when the transfer of data becomes possible.

33. A data transfer method according to claim 19, wherein said second region for said non-sequential data transfer includes a plurality of buffer storage areas.

34. A data transfer method according to claim 33, wherein each one of said plurality of buffer storage areas is arranged in an order of the time of most recent transfer of data.

35. A data transfer method according to claim 33, wherein said plurality of buffer storage areas include a capacity for accommodating a quantity of data loaded on a single track on a disk unit.

36. A data transfer method according to claim 33, wherein when a disk unit receives a request for a non-sequential data transfer and data on a track to be transferred is stored in said buffer storage areas of said second region, said disk unit transfers to said controller the data stored in said buffer storage areas of said second region.

37. A buffered disk apparatus comprising a controller including a plurality of directors, each of said directors connected to a separate disk unit of a plurality of disk units, wherein each one of said directors is connected to a processor through a channel, said apparatus comprising:

a plurality of disk units, each one of said disk units including a buffer storage area, said buffer storage area including a first region for storing data for a sequential data transfer and a second region for storing data for a non-sequential data transfer;

requesting means for sending a request for inputting of data to or a request for outputting of data from said processor to at least one of said disk units;

sending means for sending a state signal indicating whether said request is for one of inputting and outputting data of a sequential data transfer to at least one of said disk units;

transferring means for transferring data between said processor and at least one of said disk units by using said first region for sequential data transfer and said second region for non-sequential transfer in response to said state signal; and wherein said controller includes said sending means for sending said state signal.

38. A buffered disk apparatus according to claim 37, wherein said second region of each buffer comprises a single buffer storage area.

39. A buffered disk apparatus according to claim 37, wherein said first region of each buffer comprises a plurality of buffer storage areas.

40. A buffered disk apparatus according to claim 37, wherein said first region of each buffer includes a plurality of buffer storage areas, and wherein each one of said plurality of buffer storage areas is arranged in an order corresponding to the time of most recent transfer of data to or most recent transfer of data from said buffer in response to a state indicating said data transfer.

41. A buffered disk apparatus according to claim 37, wherein when said request means for sending a request to said one or more disk units for sequential data transfer in which said first region of said buffer has not been allocated, said one or more disk units allocates a request for said sequential data transfer to said buffer storage areas which have least recently transferred data to or from said buffer storage areas.

42. A buffered disk apparatus according to claim 37, wherein when said requesting means sends a request for inputting data to or outputting data from said director, said processor transmits a number indicating records for said data transfer in response to said request, wherein said sending means informs said controller of the number of records to be transferred.

* * * * *